United States Patent
Yatsuzuka

(10) Patent No.: US 8,224,992 B2
(45) Date of Patent: Jul. 17, 2012

(54) COMMUNICATION DEVICE, COMMUNICATION SYSTEM THEREFOR, AND COMPUTER PROGRAM THEREFOR

(75) Inventor: Masahiko Yatsuzuka, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 584 days.

(21) Appl. No.: 12/375,962

(22) PCT Filed: Aug. 7, 2007

(86) PCT No.: PCT/JP2007/065408
§ 371 (c)(1),
(2), (4) Date: Feb. 2, 2009

(87) PCT Pub. No.: WO2008/018436
PCT Pub. Date: Feb. 14, 2008

(65) Prior Publication Data
US 2010/0022309 A1    Jan. 28, 2010

(30) Foreign Application Priority Data
Aug. 10, 2006    (JP) ................................. 2006-217931

(51) Int. Cl.
*G06F 15/16* (2006.01)
(52) U.S. Cl. .......................................... 709/243; 463/42
(58) Field of Classification Search .................... 463/42; 709/205, 248, 243
See application file for complete search history.

(56) References Cited

U.S. PATENT DOCUMENTS

| | | | | |
|---|---|---|---|---|
| 5,820,463 A | * | 10/1998 | O'Callaghan | 463/42 |
| 6,012,096 A | * | 1/2000 | Link et al. | 709/233 |
| 6,038,599 A | | 3/2000 | Black et al. | |
| 7,016,942 B1 | * | 3/2006 | Odom | 709/212 |
| 2003/0164084 A1 | * | 9/2003 | Redmann et al. | 84/615 |

(Continued)

FOREIGN PATENT DOCUMENTS

| | | |
|---|---|---|
| EP | 1640047 A1 | 3/2006 |
| JP | 2003-325982 A | 11/2003 |
| JP | 2004-174091 A | 6/2004 |
| WO | WO 97/47091 | 12/1997 |
| WO | WO 01/57678 A1 | 8/2001 |

OTHER PUBLICATIONS

Takuji Iimura, Hiroaki Hazeyama, and Youki Kadobayashi. 2004. Zoned federation of game servers: a peer-to-peer approach to scalable multi-player online games. In Proceedings of 3rd ACM SIGCOMM workshop on Network and system support for games (NetGames '04). ACM, New York, NY, USA.*

(Continued)

*Primary Examiner* — Ajay Bhatia
(74) *Attorney, Agent, or Firm* — Sughrue Mion, PLLC

(57) ABSTRACT

A method, device and system, whereby communication delay that affects the advancement of an interactive task such as a multiple-player participation game is reduced is disclosed. A game system has a large number of game devices. A game device is grouped with three or more other devices to form a group, in which one device becomes a provisional parent node, and the other devices become provisional child nodes. Each of the game devices in the group generates measurement data indicating the sum of response times with respect to other game devices with itself as an origin. The game device that has generated measurement data indicating the minimum sum is selected as a parent node by the provisional parent node, and the other game devices are selected to be child nodes. A child node communicates with another child node via a parent node.

11 Claims, 22 Drawing Sheets

U.S. PATENT DOCUMENTS

| | | | | |
|---|---|---|---|---|
| 2003/0204565 | A1* | 10/2003 | Guo et al. | 709/205 |
| 2004/0087371 | A1 | 5/2004 | Yamana et al. | 463/42 |
| 2004/0087372 | A1 | 5/2004 | Yamana et al. | 463/42 |
| 2004/0174829 | A1* | 9/2004 | Ayyagari | 370/254 |
| 2004/0259642 | A1* | 12/2004 | Tanaka et al. | 463/42 |
| 2005/0181877 | A1* | 8/2005 | Kuwahara et al. | 463/42 |
| 2005/0193120 | A1* | 9/2005 | Taylor | 709/227 |
| 2006/0106963 | A1 | 5/2006 | Sasaki et al. | 710/110 |

OTHER PUBLICATIONS

Jiantao Song; Chaofeng Sha; Hong Zhu; , "Nash equilibria in parallel downloading with multiple clients," Distributed Computing Systems, 2004. Proceedings. 24th International Conference on , vol., No., pp. 94-101, 2004.*

Sylvia Ratnasamy, Paul Francis, Mark Handley, Richard Karp, and Scott Shenker. 2001. A scalable content-addressable network. SIGCOMM Comput. Commun. Rev. 31, 4 (Aug. 2001), 161-172.*

Björn Knutsson , Massively Multiplayer Games , Honghui Lu , Wei Xu , Bryan Hopkins, Peer-to-Peer Support for Massively Multiplayer Games (2004).*

International Search Report of Application No. PCT/JP2007/065408, dated Nov. 6, 2007.

Supplemental European Search Report, dated Feb. 26, 2010, in corresponding European Application No. 07792077.5.

* cited by examiner

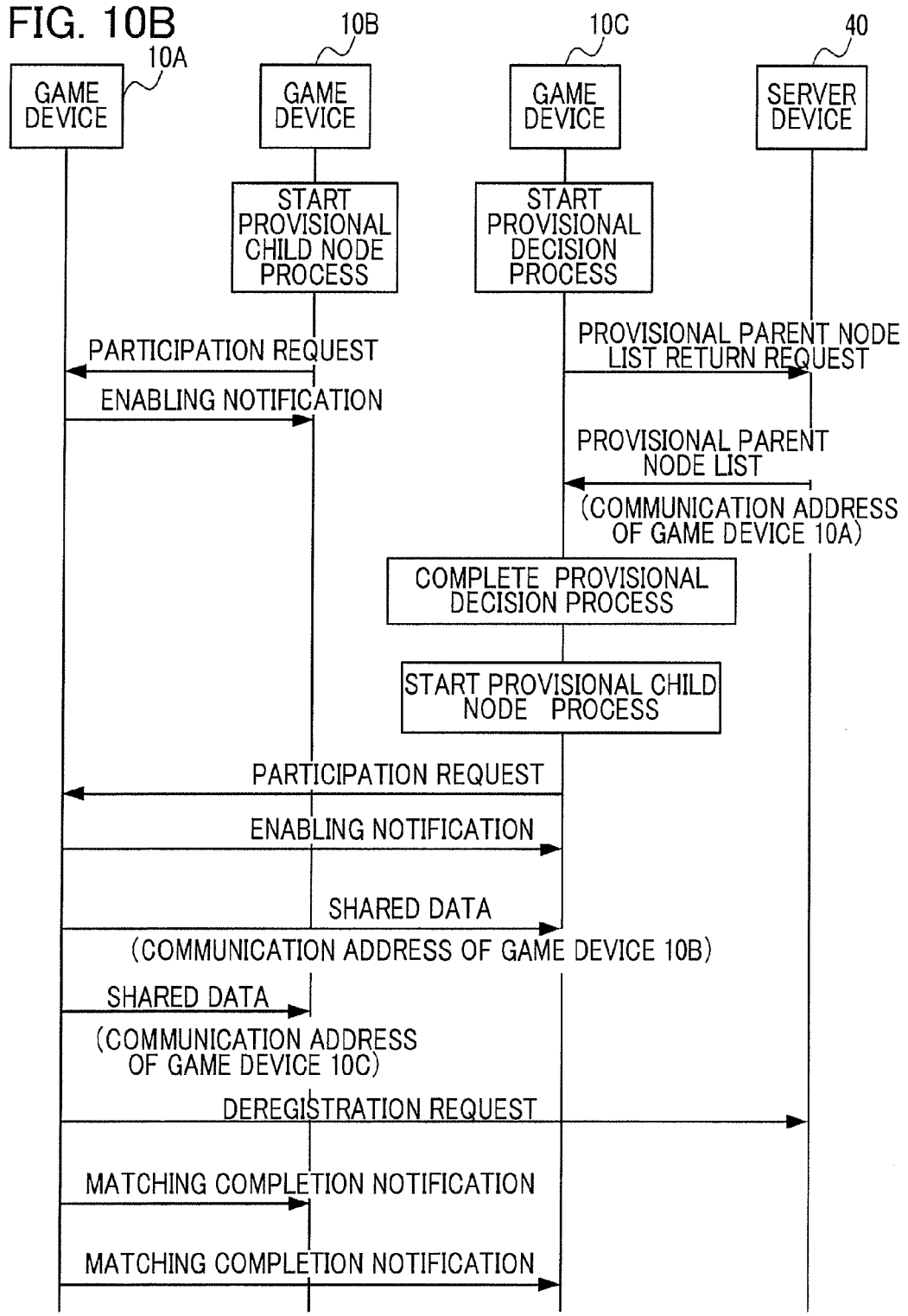

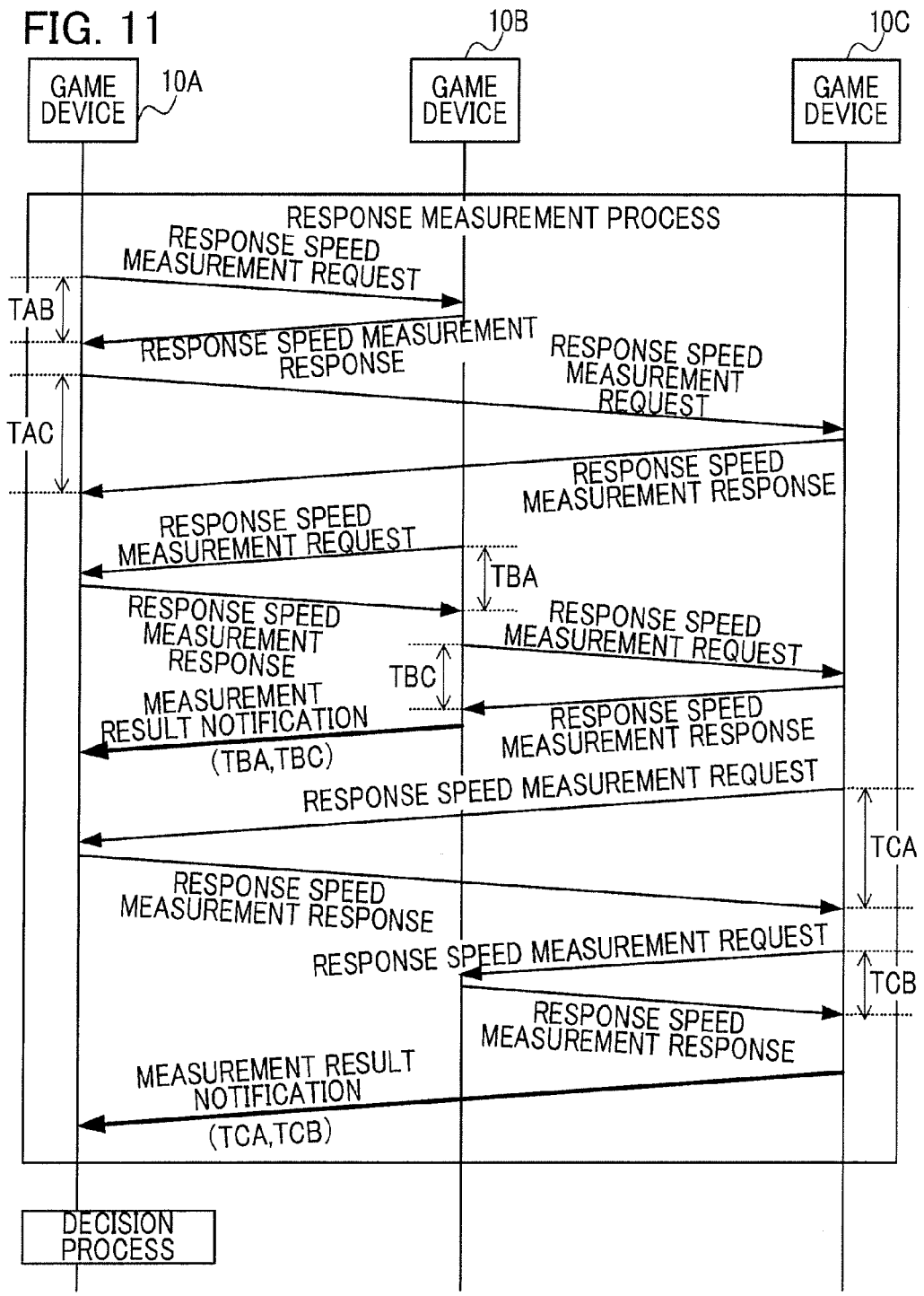

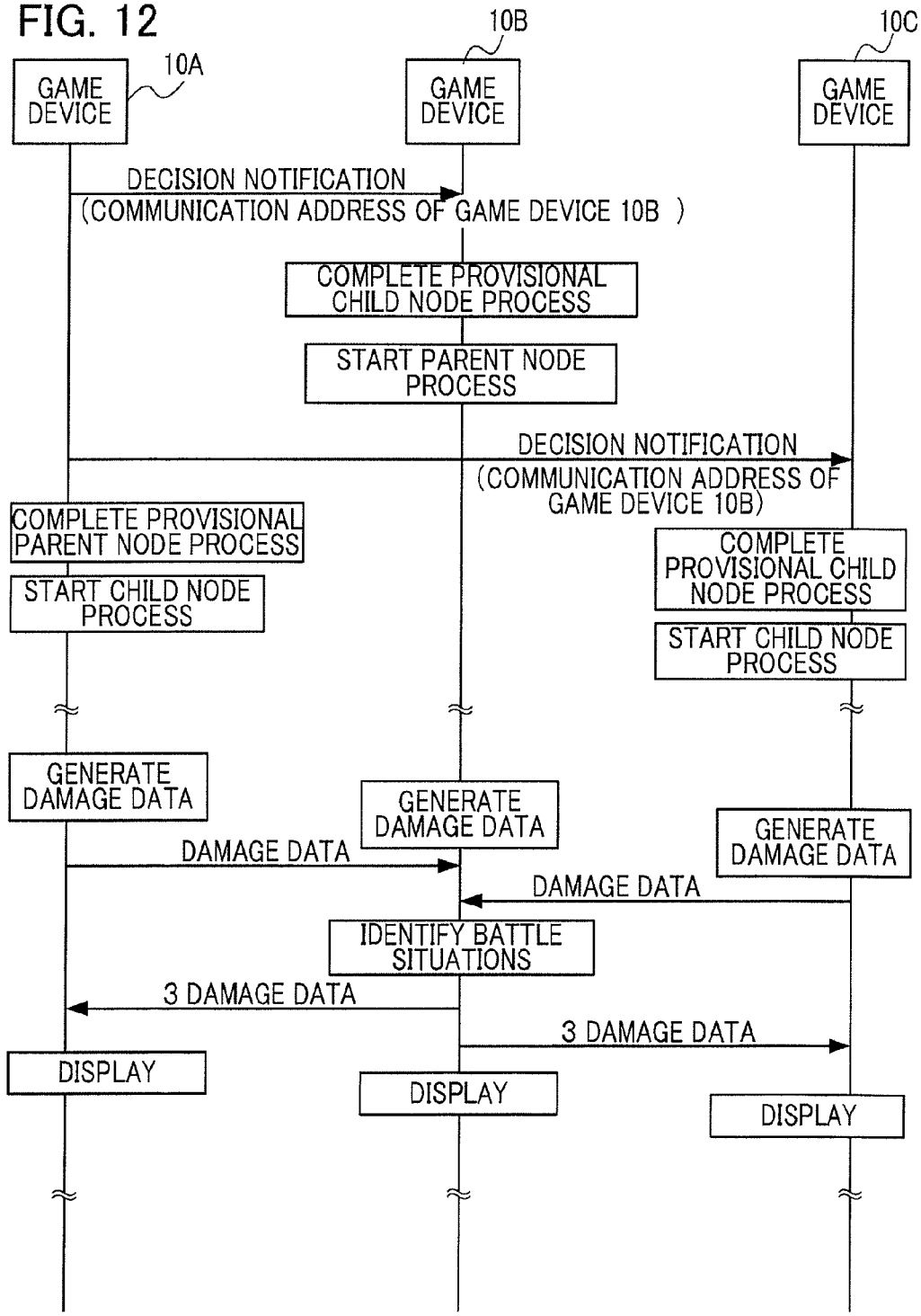

COMMUNICATION DEVICE, COMMUNICATION SYSTEM THEREFOR, AND COMPUTER PROGRAM THEREFOR

CROSS-REFERENCE to PRIOR APPLICATIONS

This application is a filing under 35 U.S.C.§371 of International Application No. PCT/JP2007/065408, filed on Aug. 7, 2007, which claims priority to Japanese Application No. 2006-217391, filed Aug. 10, 2006, the disclosure of each of which is incorporated herein by express reference thereto.

TECHNICAL FIELD

The present invention relates to a communication device, to a communication system therefor, and to a computer program therefor.

BACKGROUND ART

Game systems in which plural game devices transmit and receive data through a network to play a multiple-player-participation type game are in widespread use. The above games progress by each participant playing the participant's own role. One type of the above game system is one in which, from among game devices that are participants of the same game, one game device serves as a parent node (server terminal), and the remaining game devices serve as child nodes (client terminals). In this game system, transmission and receipt of data is performed mainly between a parent node and a child node.

In this game system, the situations of a game are shared among participant game devices of the same game. The situations of a game that are shared are, for example, scores and a position of an object which a participant operates in an imaginary space. The situations of a game that are shared are usually decided by a parent node game device. Therefore, a response to an input instruction is quicker at a parent node than at a child node. For example, Published Japanese Translation No. 2000-511667 of the PCT International Publication proposes a technique in which, in a case of advancing a game in which there are plural types of roles for participants (for example, a main player and a minor player) is played, a game device that will function as a parent node is decided based on the type of the role, whereby the smooth advancing of the game is enabled. In this technique, the game device of a participant that will take a role (for example, the main player) required to respond to an input instruction the most expeditiously will serve as the parent node.

However, the desired effects of the technique of Published Japanese Translation No. 2000-511667 of the PCT International Publication are attainable only if this technique is applied to a game in which there are plural types of roles for participants. The effects cannot be attained if this technique is applied to other types of games. Furthermore, in this technique, from among participant game devices, two game devices that have a small transmission delay when direct communication therebetween is performed might be selected as child nodes, and a game device that has a large transmission delay when direct communication is performed with each of the other game devices might be selected as a parent node. In a case in which such a game device is selected as a parent node, a transmission delay will occur when the exchanging of data between a parent node and child nodes is mainly performed, and as a result, communication delay in advancing the game will increase. This will inhibit the smooth progress of a game and will lead to the degradation in the degree of reliability in advancing the game.

DISCLOSURE OF INVENTION

The present invention has as objects to provide a communication device that can decrease delay in communication that affects the progress of interactive tasks in a multiple-participation game by selecting one of three or more communication devices as a parent node, a communication system therefor, and a computer program therefor.

In the following, description will be given of the present invention. It should be noted that reference numerals in the attached drawings are shown in parentheses to facilitate understanding of the present invention; however, this is not intended to limit the present invention to the embodiments as shown in the drawings.

The present invention provides a communication device (10, 50, 70) that has a participator that participates in a group consisting of three of more communication devices (10, 50, 70), in which group one of the three or more communication devices (10, 50, 70) will become a provisional parent node; a communication interface (17) for transmitting and receiving signals to and from a network (1,25); a game data transmitter-receiver (11) that transmits and receives game data using the communication interface (17); and a measurement data generator (11) that generates measurement data indicating the sum of measured response times after measuring a response time of the communication device (10, 50, 70), the response time including a transmission delay time between the communication device and each of the other communication devices (10, 50, 70) and a process delay time at each communication device (10, 50, 70), and in a case in which the communication device is not the provisional parent node, and the communication device (10, 50, 70) further has: a measurement data transmitter that transmits the measurement data to another communication device (10, 50, 70) that is the provisional parent node; and a decision data receiver that receives decision data indicating one communication device (10, 50, 70) that is a parent node from another communication device (10, 50, 70) that is the provisional parent node, and in a case in which the communication device (10, 50, 70) is the provisional parent node, the communication device (10, 50, 70) further has a measurement data receiver that receives measurement data from another communication device (10, 50, 70) of the group; a decision data generator that, in a case in which it is determined, based on the measurement data received by the measurement data receiver and the measurement data generated by the measurement data generator, that the measurement data of the communication device (10, 50, 70) is the only data piece that indicates the minimum value from among pieces of measurement data of the communication devices (10, 50, 70) in the group, generates the decision data indicating that the communication device (10, 50, 70) is the parent node, and otherwise generates the decision data indicating that one of the other communication devices (10, 50, 70) that has transmitted the only data piece is the parent node; and a decision data transmitter that transmits the decision data to each of the other communication devices (10, 50, 70) of the group, and the game data transmitter-receiver, in transmitting game data, performs the transmission through a direct communication in a case in which the communication device (10, 50, 70) is the parent node, whereas in a case in which the communication device (10, 50, 70) is not a parent node, performs the transmission through an indirect communication via a communication device (10, 50, 70) that is the parent node.

The "provisional parent node" is one of the three or more communication devices that are in one group and is a communication device that collects measurement data from each of the other communication devices. The "parent node" is one of the three or more communication devices that are in one group and is a communication device through which data is transmitted during an indirect communication with the other communication devices. A communication device that is not a parent node is a "child node". The "game data" is data which is to be transmitted to and received from a communication device that is not a parent node through an indirect communication via a communication device that is a parent node.

In a case in which a game system is configured using the above communication device, since a communication device that has the minimum sum of response times from among the three or more communication devices that are in one group will be the parent node, the transmission delay (accumulated value) of data to be passed over from a child node via a parent node to another child node will become the shortest. Furthermore, the average time, among plural child nodes in the same group, of transmission delays of data to be passed over from a child node via the parent node to another child node will also be the shortest. Therefore, according to the above communication device, a communication delay that affects the progress of interactive tasks can be reduced.

The above communication device (10, 50, 70) may further have an input unit (14) that receives a player's operation and outputs an operation signal in accordance with the operation; a game data generator (11) that generates the game data based on the operation signal; and a controller (11) that advances the game based on the game data received by the game data transmitter-receiver (11). Therefore, the communication device may be a game device. In this case, the interactive tasks that progress is, for example, multiple-player participation games. Multiple-player participation games progress smoothly in a case in which a communication delay that affects the progress of the game is reduced.

Furthermore, the present invention provides a communication system (100, 300) that has three or more communication devices (10, 50, 70) that are in one group; in the communication system, one of the communication devices (10, 50, 70) that are in the group becomes a provisional parent node, and for each of the three or more communication devices (10, 50, 70), a response time of the communication device (10, 50, 70) includes a transmission delay time between the communication device (10, 50, 70) and each of the other communication devices (10, 50, 70) and a process delay time at each of the other communication devices (10, 50, 70); each of the three or more communication devices (10, 50, 70) has a communication interface (17) for transmitting to and receiving signals from a network (1, 25); a game data transmitter-receiver (11) that transmits and receives game data using the communication interface (17); and a measurement data generator (11) that generates measurement data indicating the sum of measured response times after measuring a response time of the communication device (10, 50, 70), and in a case in which the communication device (10, 50, 70) is not the provisional parent node, the communication device (10, 50, 70) further has a measurement data transmitter that transmits the measurement data to another communication device (10, 50, 70) that is the provisional parent node; and a decision data receiver that receives decision data indicating one communication device (10, 50, 70) that is a parent node from another communication device (10, 50, 70) that is the provisional parent node, and in a case in which the communication device (10, 50, 70) is the provisional parent node, the communication device (10, 50, 70) further has a measurement data receiver that receives measurement data from another communication device (10, 50, 70) of the group; a decision data generator that, in a case in which it is determined, based on the measurement data received by the measurement data receiver and the measurement data generated by the measurement data generator, that the measurement data of the communication device (10, 50, 70) is the only data piece that indicates the minimum value from among pieces of measurement data of the communication devices (10, 50, 70) in the group, generates the decision data indicating that the communication device (10, 50, 70) is the parent node, and otherwise generates the decision data indicating that one of the other communication devices (10, 50, 70) that has transmitted the only data piece is the parent node; and a decision data transmitter that transmits the decision data to each of the other communication devices (10, 50, 70) of the group, and the game data transmitter-receiver (11), in transmitting game data, performs the transmission through a direct communication in a case in which the communication device (10, 50, 70) is the parent node, whereas in a case in which the communication device (10, 50, 70) is not the parent node, performs the transmission through an indirect communication via a communication device (10, 50, 70) that is the parent node.

According to this game system, since from among three or more communication devices that are in one group, a communication device for which the sum of response times is the minimum will be a parent node, the transmission delay (accumulated value) of data to be passed over from a child node via a parent node to another child node will become the shortest. Furthermore, the average time, among plural child nodes in the same group, of transmission delays of data to be passed over from a child node via a parent node to another child node will also be the shortest. Therefore, a communication delay that affects the progress of interactive tasks can be reduced.

Furthermore, the present invention provides a communication system (200) that has a server device (60) and three or more communication devices (10, 50, 70) that are in one group, and for each of the three or more communication devices (10, 50, 70), a response time of the communication device (10, 50, 70) includes a transmission delay time between the communication device (10, 50, 70) and each of the other communication devices (10, 50, 70) and a process delay time at each of the other communication devices (10, 50, 70), each of the three or more communication devices (10, 50, 70) has a communication interface (17) for transmitting and receiving signals to and from a network (1, 25); a game data transmitter-receiver (11) that transmits and receives game data using the communication interface (17); a measurement data generator (11) that generates measurement data indicating the sum of measured response times after measuring a response time of the communication device (10, 50, 70), a measurement data transmitter that transmits the measurement data to the server device (60); and a decision data receiver that receives decision data indicating one communication device (10, 50, 70) that is a parent node from the server device (60), and the server device (60) receives measurement data from the three or more communication devices (10, 50, 70), and in a case in which one of the received pieces of measurement data indicates the minimum value, transmits to each of the three or more communication devices (10, 50, 70), a piece of the decision data indicating a communication device (10, 50, 70) that has transmitted a piece of the measurement data having the minimum value, and the game data transmitter-receiver (11), in transmitting game data, performs the transmission through a direct communication in a case in which the communication device (10, 50, 70) is the parent node, whereas in a case in which the communication device (10, 50, 70) is not the parent node, performs the transmission through an indirect communication via a communication device (10, 50, 70) that is the parent node.

According to this game system, since from among three or more communication devices that are in one group, a communication device for which the sum of response times is the minimum will be a parent node, the transmission delay (accumulated value) of data to be passed over from a child node via a parent node to another child node will become the shortest. Furthermore, the average time, among plural child nodes in the same group, of transmission delays of data to be passed over from a child node via a parent node to another child node will also be the shortest. Therefore, a communication delay that affects the progress of interactive tasks can be reduced.

In the above communication system (100, 200, 300), there may be four or more communication devices (10, 50, 70) including the three or more communication devices (10, 50, 70), and each of the four or more communication devices (10, 50, 70) may be allowed to belong to the group. Furthermore, or alternatively, each of the communication devices (10, 50, 70) that are in the group may have an input unit (14) that receives a player's operation and outputs an operation signal in accordance with the operation; a game data generator (11) that generates the game data based on the operation signal; and a controller (11) that advances the game based on game data received by the game data transmitter-receiver (11).

Furthermore, the present invention provides a computer program (181, 431) for causing a communication device to function as a participator that participates in a group consisting of three of more communication devices (10, 50, 70), in which group one of the three or more communication devices (10, 50, 70) will become a provisional parent node; a communication interface (17) for transmitting and receiving signals to and from a network (1, 25); a game data transmitter-receiver (11) that transmits and receives game data using the communication interface (17); and a measurement data generator (11) that generates measurement data indicating the sum of measured response times after measuring a response time of the communication device (10, 50, 70), the response time including a transmission delay time between the communication device (10, 50, 70) and each of the other communication devices (10, 50, 70) and a process delay time at each of the other communication devices (10, 50, 70), and in a case in which the communication device (10, 50, 70) is not the provisional parent node, the computer program causes the communication device (10, 50, 70) to function as: a measurement data transmitter that transmits the measurement data to another communication device (10, 50, 70) that is the provisional parent node; and a decision data receiver that receives decision data indicating one communication device (10, 50, 70) that is a parent node from another communication device (10, 50, 70) that is the provisional parent node, and in a case in which the communication device (10, 50, 70) is the provisional parent node, the computer program causes the communication device (10, 50, 70) to function as: a measurement data receiver that receives measurement data from another communication device (10, 50, 70) of the group; a decision data generator that, in a case in which it is determined, based on the measurement data received by the measurement data receiver and the measurement data generated by the measurement data generator, that the measurement data of the communication device (10, 50, 70) is the only data piece that indicates the minimum value from among pieces of measurement data of the communication devices (10, 50, 70) in the group, generates the decision data indicating that the communication device (10, 50, 70) is the parent node, and otherwise generates the decision data indicating that one of the other communication devices (10, 50, 70) that has transmitted the only data piece is the parent node; and a decision data transmitter that transmits the decision data to each of the other communication devices (10, 50, 70) of the group, and the game data transmitter-receiver (11), in transmitting game data, performs the transmission through a direct communication in a case in which the communication device (10, 50, 70) is the parent node, whereas in a case in which the communication device (10, 50, 70) is not the parent node, performs the transmission through an indirect communication via a communication device (10, 50, 70) that is the parent node.

In a case in which a game system is configured by using a communication device that executes the above computer program, since from among the three or more communication devices that are in one group, a communication device for which the sum of response times is the minimum will be a parent node, the transmission delay (accumulated value) of data to be passed over from a child node via a parent node to another child node will become the shortest. Furthermore, the average time, among plural child nodes in the same group, of transmission delays of data to be passed over from a child node via a parent node to another child node will also be the shortest. Therefore, according to the above computer program, a communication delay that affects the progress of interactive tasks can be reduced.

EFFECTS OF THE INVENTION

According to the present invention, by selecting one of three or more communication devices as a parent node, a communication delay that affects the progress of interactive tasks such as multiple-player participation games can be reduced.

BRIEF DESCRIPTION OF THE DRAWINGS

FIG. 10B is a sequence chart showing an operational example of game system 100.

FIG. 11 is a sequence chart showing an operational example of game system 100.

FIG. 12 is a sequence chart showing an operational example of game system 100.

BEST MODE FOR CARRYING OUT THE INVENTION

Description will be given of a preferred embodiment of the present invention. In the first embodiment, a matching server device is involved in grouping of game devices, but a game device performs selection of a parent node. In the second embodiment, the grouping of game devices is performed by a matching server device and the selection of a parent node is performed by the matching server device. In the third embodiment, the grouping of game devices is performed by a game device, and the selection of a parent node is performed by a game device.

First Embodiment

Figure 1:
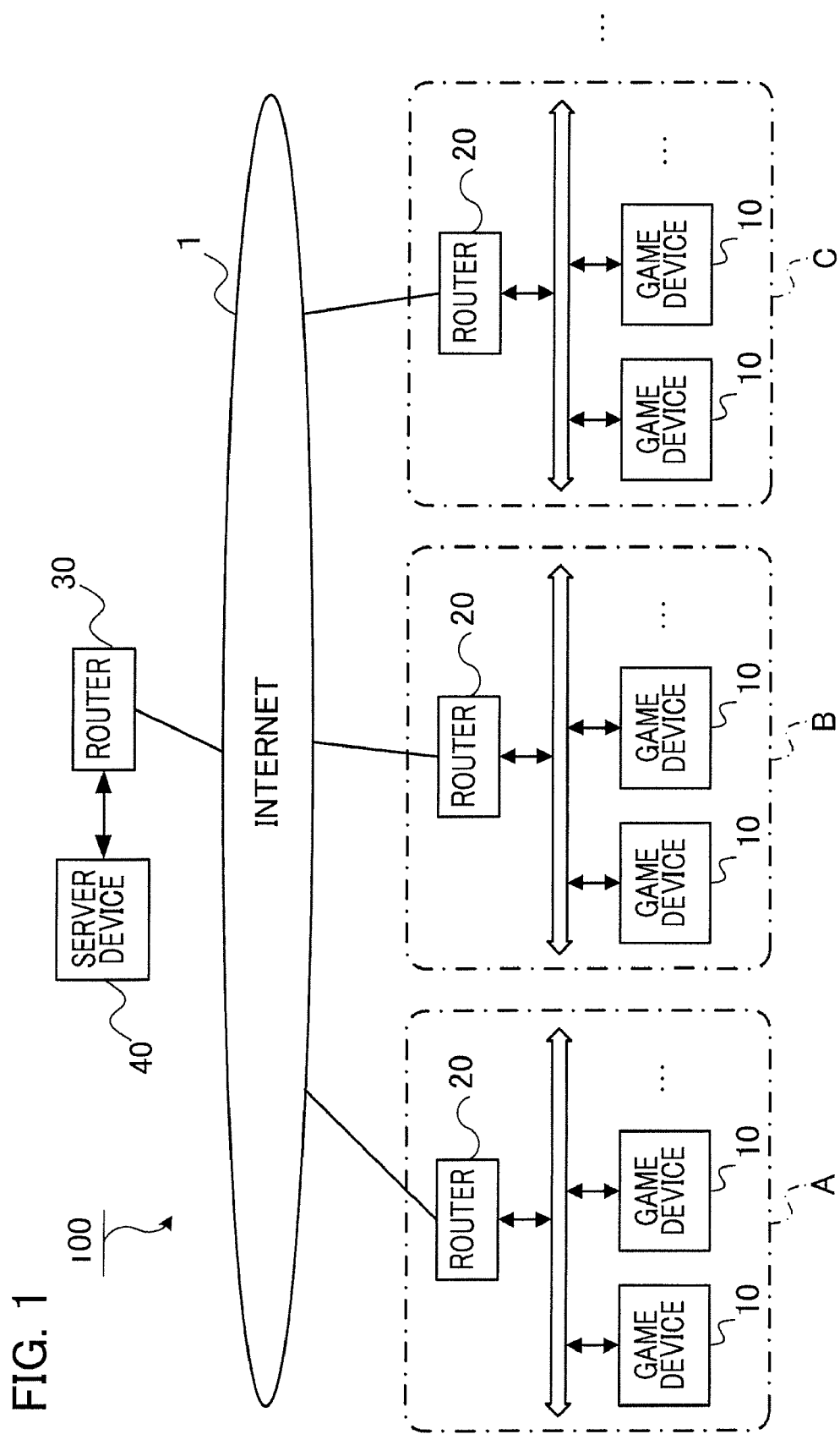
FIG. 1 is a block diagram showing an overall configuration of a game system 100 according to a first embodiment of the present invention.

FIG. 1 is a block diagram showing an overall configuration of a game system (communication system) 100 according to the first embodiment of the present invention. Game system 100 is a system for enabling three participants to play a tank game. In the tank game, each participant maneuvers a tank of the participant in a virtual space, which is a battlefield. The battlefield includes the camps of each participant, and each participant competes to minimize damage to the camp.

In game system 100, a matching server device 40 is connected to an Internet 1 via a router 30. Plural LANs (Local Area Networks) 25 respectively provided in plural venues including venues A, B, C, . . . , are connected to Internet 1 via a router 20 in each venue. Each router 20 has a function of building, on Internet 1, a VPN (Virtual Private Network) which is a virtual exclusive network. Plural game devices 10 are provided at each venue. Each game device 10 is used by a participant, and the game device participates in a tank game in which its participant participates and enables the participant to play the tank game. The game device is capable of communicating with other game devices 10 in the venue through LAN 25 and is also capable of communicating, via LAN 25, router 20, and the VPN, with matching server device 40 and game devices 10 of other venues.

Figure 2:
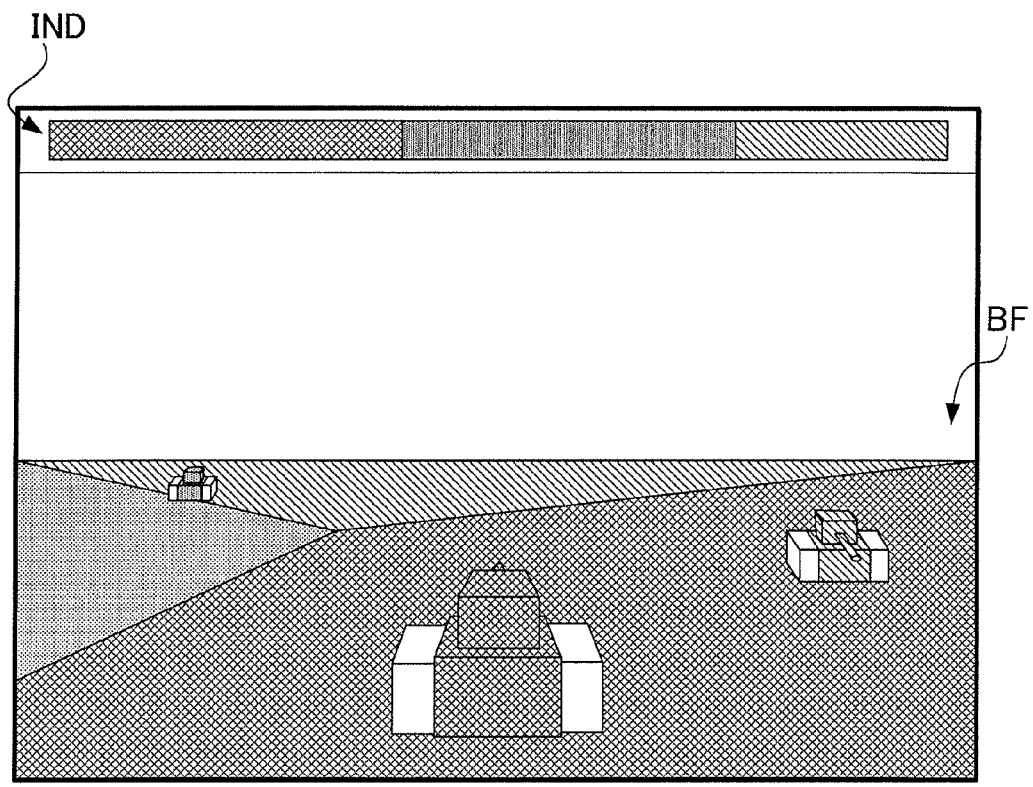
FIG. 2 is a diagram showing an example image displayed at a game device 10 included in game system 100.

FIG. 2 is a diagram showing an example image displayed at game device 10. As shown in the figure, an image is displayed at game device 10, the image showing a situation of tank game in which this game device 10 is participating. Specifically, an image of a battlefield BF and a situation indicator IND showing a proportion of damage to each camp are displayed. The proportion is determined based on the damage to each three camps. The damage to each camp includes damage to a tank of this camp participant. As is obvious from the foregoing description, the situations of a tank game are shared by game devices participating in the tank game and should be uniquely determined at one device.

We assume a mode in which the situations of a tank game are determined by a particular server device. In this mode, the situations of tank games that are being performed concurrently are determined by the particular server device. That is, burden is concentrated on the particular server device. Therefore, this mode is not suited for a large-scale game system in which a large number of tank games are performed concurrently. Conversely, in each embodiment of the present invention, the situations of a tank game are determined by one game device 10 participating in the tank game, whereby the burden is dispersed. In the following, in each tank game, from among game devices participating in the tank game, one game device that determines the situations of the tank game will be referred to as a "parent node", and each of the other two game devices will be referred to as a "child node". In each embodiment of the present invention, a parent node transmits to and receives data from only child nodes, and a child node transmits to and receives data from mainly the parent node.

In a mode in which the situations of a tank game are determined by a parent node participating in the tank game, when game data (for example, operation data, described later) that affects the determination of the situations of the tank game is generated at a child node, this game data is passed to the parent node, and a process using this game data is performed at the parent node so that a situation of the tank game is determined. Situation data indicating this situation is passed to each child node, and an image showing the situation (image that reflects the game data) is displayed at the parent node and each child node. The process using the game data is, for example, a process of identifying the position or the posture of a tank, a process of identifying the position of a cannon-shot, a determination process of determining whether a cannon-shot hit an object such as tanks, and a process of identifying each the damage to each camp. Hereinafter, time required since game data is generated until an image that reflects the game data is displayed at each child node will be referred to as a reflection delay time of the child node.

The reflection delay time of a child node will be the time that is slightly longer than a response time between a parent node and a child node when the child node is an origin. The "response time between a parent node and a child node when the child node is an origin" is the sum of a transmission delay time of signal from A to B, a process delay time at B, and a transmission delay time of signal from B to A. As is obvious from this, a response time between a parent node and a child node with the child node as an origin depends on a geographical factor such as a distance between each child node and a parent node and a factor relating to network configuration such as signal transmission speed of a communication path between each child node and a parent node. Therefore, a response time between a parent node and each child node when the child node is an origin, i.e., a reflection delay time of each child node, depends on which game device 10 will serve as a parent node. Description about this will be given further with specific examples.

Figure 3:
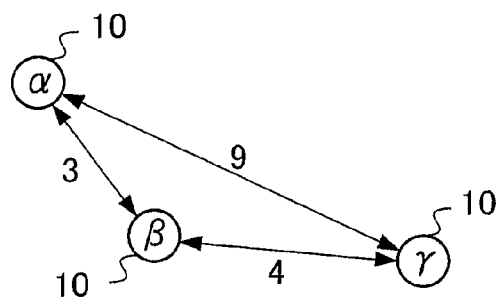
FIG. 3 is a diagram for describing the relationship between allocation of a parent node and a response time.

FIG. 3 is a diagram for describing the relationship between allocation of a parent node and a response time. In this figure, a transmission delay time between a first game device 10 ($\alpha$) and a second game device 10 ($\beta$) is 3; a transmission delay time between $\beta$ and a third game device 10 ($\gamma$) is 4; and a transmission delay time between $\gamma$ and $\alpha$ is 9. A process delay time at α, β, and γ is each 1. Provided that α is a parent node and that β and γ each are child nodes, a response time with respect to the parent node with β as a basal point will be 3+1+3=7; and a response time with respect to the parent node with γ as a basal point will be 9+1+9=19. Conversely, provided that β is a parent node and that α and γ each are child nodes, a response time with respect to the parent node with α as a basal point will be 3+1+3=7; and a response time with respect to the parent node with γ as a basal point will be 4+1+4=9. In other words, a response time with respect to the parent node with γ as a basal point is shorter in a case in which β is a parent node (9) than a case in which α is a parent node (19), and therefore, reflection delay time of γ is shorter in a case in which β is a parent node than a case in which α is a parent node.

On the other hand, because, as described above, operation data is included as game data, the display of an image at a child node will be delayed from the operation by a participant in a case in which a reflection delay time with respect to a parent node with this child node as a basal point is long. Such a delay is not preferable also in game data other than operation data. Therefore, a shorter reflection delay time of each child node is better. Also, a reflection delay time of each child node is slightly longer than a response time with respect to the parent node with this child node as a basal point. Therefore, a shorter response time with respect to the parent node with each child node as a basal point is better.

When taken together, a shorter response time with respect to the parent node with each child node as a basal point is better, and this response time depends on which one of game devices 10 participating in the same tank game will act as a parent node. Therefore, it is crucial which of game devices 10 participating in the same tank game will be selected as a parent node.

In game system 100, before playing a tank game, participants of the tank game must be identified. This operation will be referred to as "matching". The matching is performed in accordance with a procedure in which one of game devices 10 expresses participation in a tank game to become a provisional parent node and other game devices 10, as provisional child nodes, express participation to game device 10 that is the provisional parent node. One of the provisional parent node and provisional child nodes will then be selected as a parent node, and the remaining nodes will be determined as child nodes, after which the tank game will be started.

Figure 4:
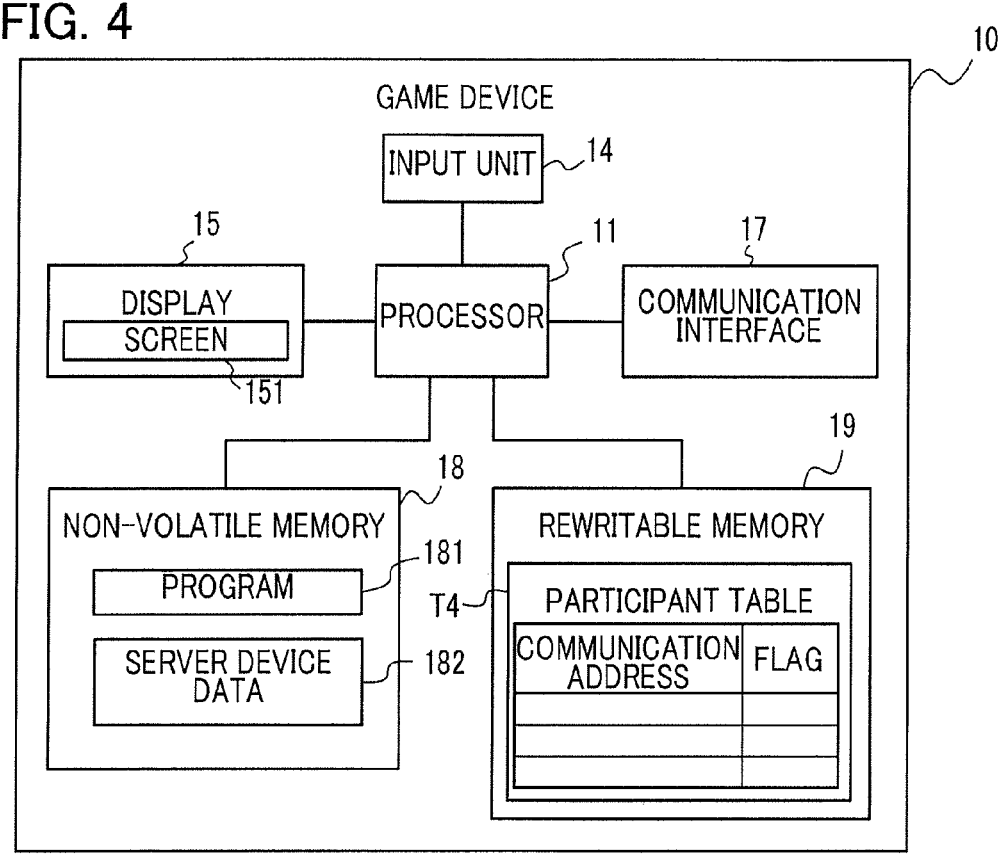
FIG. 4 is a block diagram showing a configuration of game device 10.

Game Device 10:

FIG. 4 is a block diagram showing a configuration of game device 10. As shown in the figure, game device 10 has a processor 11, an input unit 14, a display 15, a communication interface 17, a non-volatile memory 18, and a rewritable memory 19. Processor 11 is, for example, one or more CPUs (Central Processing Units).

Input unit 14 has plural operators and when each operator is operated, receives this operation, to supply to processor 11 an operation signal in response to the operation. The plural operators include a handle-type operator for changing the direction of a tank, a button-type operator for starting a provisional decision process (described later) or for causing a tank to fire a cannon-shot, and a peddle-type operator for moving a tank.

Display 15 has a screen 151 and when image data is supplied from processor 11, displays an image represented by the image data on screen 151. A monitor or a video projector can be used as display 15. In a case in which a video projector is used, a screen on which an image is to be projected is screen 151. Communication interface 17 transmits and receives signals to and from LAN 25 and relays data from processor 11 and LAN 25 and vice versa. Processor 11 transmits and receives data to and from another device by using communication interface 17.

Non-volatile memory 18 is, for example, a ROM (Read Only Memory) or an EEPROM (Electronically Erasable and Programmable ROM) and stores a program 181 and server device data 182. Program 181, by being executed by processor 11, causes game device 10 to perform various processes (a provisional decision process, a provisional parent node process, a provisional child node process, a parent node process, and a child node process) which will be described later. In the following description, a process by processor 11 will be performed by program 181. Server device data 182 is data required for obtaining a communication address of matching server device 40.

Rewritable memory 19 is, for example, a RAM (Random Access Memory) and reserves in its memory area a participant table T4 that stores participant data. Participant table T4 has three records respectively corresponding to each participant. Each record stores a communication address of a participant game device 10 and a flag showing a type of this game device 10. Different types of game device 10 include a parent node, a child node, a provisional parent node, and a provisional child node. In the present embodiment, the value of the flag is equal between a case in which the flag indicates a parent node and a case in which the flag indicates a provisional parent node and also between a case in which the flag indicates a child node and a case in which the flag indicates a provisional child node. However, the present embodiment may be modified to another mode. Rewritable memory 19 is also used as temporary storage for a communication address of a device that has transmitted data received by processor 11, storage for image data including image BF and situation indicator IND, and storage for situation data. It is to be noted that non-volatile memory 18 or rewritable memory 19 stores a communication address of game device 10.

Figure 5:
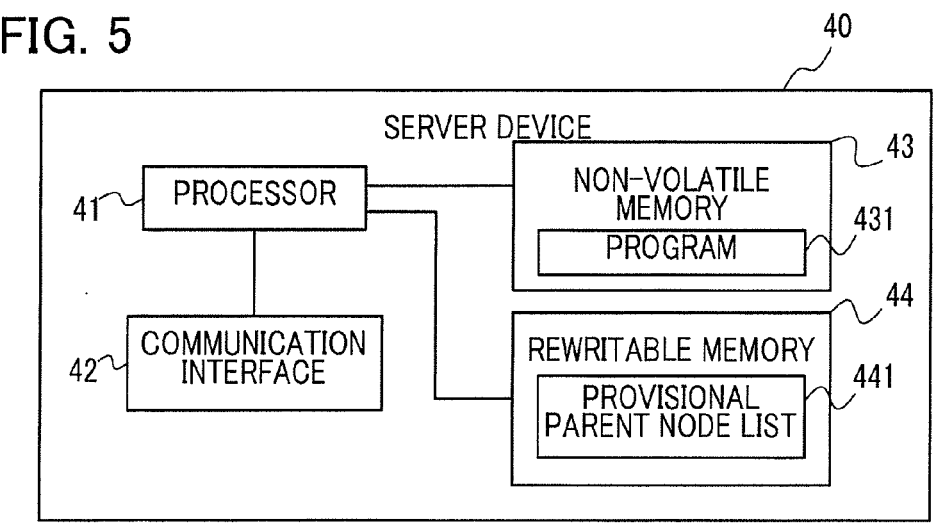
FIG. 5 is a block diagram showing a configuration of a matching server device 40 included in game system 100.

Matching Server Device 40:

FIG. 5 is a block diagram showing a configuration of a matching server device 40 included in game system 100. As shown in the figure, matching server device 40 has a processor 41, a communication interface 42, a non-volatile memory 43, and a rewritable memory 44. Processor 41 is, for example, at least one CPU. Communication interface 42 is for transmitting and receiving signals to and from router 30 and for relaying data from processor 41 to router 30 and vice versa. Processor 41 uses communication interface 42 to exchange data with another device.

Non-volatile memory 43 is, for example, a ROM and a hard disk. ROM stores an IPL (Initial Program Loader), and a hard disk stores program 431. Program 431 is executed by processor 41, thereby to cause matching server device 40 to perform a lobby process that will be described later. In the following description, a process by processor 41 is performed using program 431. Furthermore, non-volatile memory 43 stores a communication address of matching server device 40. Rewritable memory 44 is, for example, a RAM and stores a provisional parent node list 441 that is a sequence of data pieces indicating communication addresses of game devices 10 that function as provisional parent nodes. When matching server device 40 is turned on, provisional parent node list 441 will be empty. Rewritable memory 44 is also to be used as temporary storage of a communication address of a device that has transmitted data received by processor 41.

Figure 6:
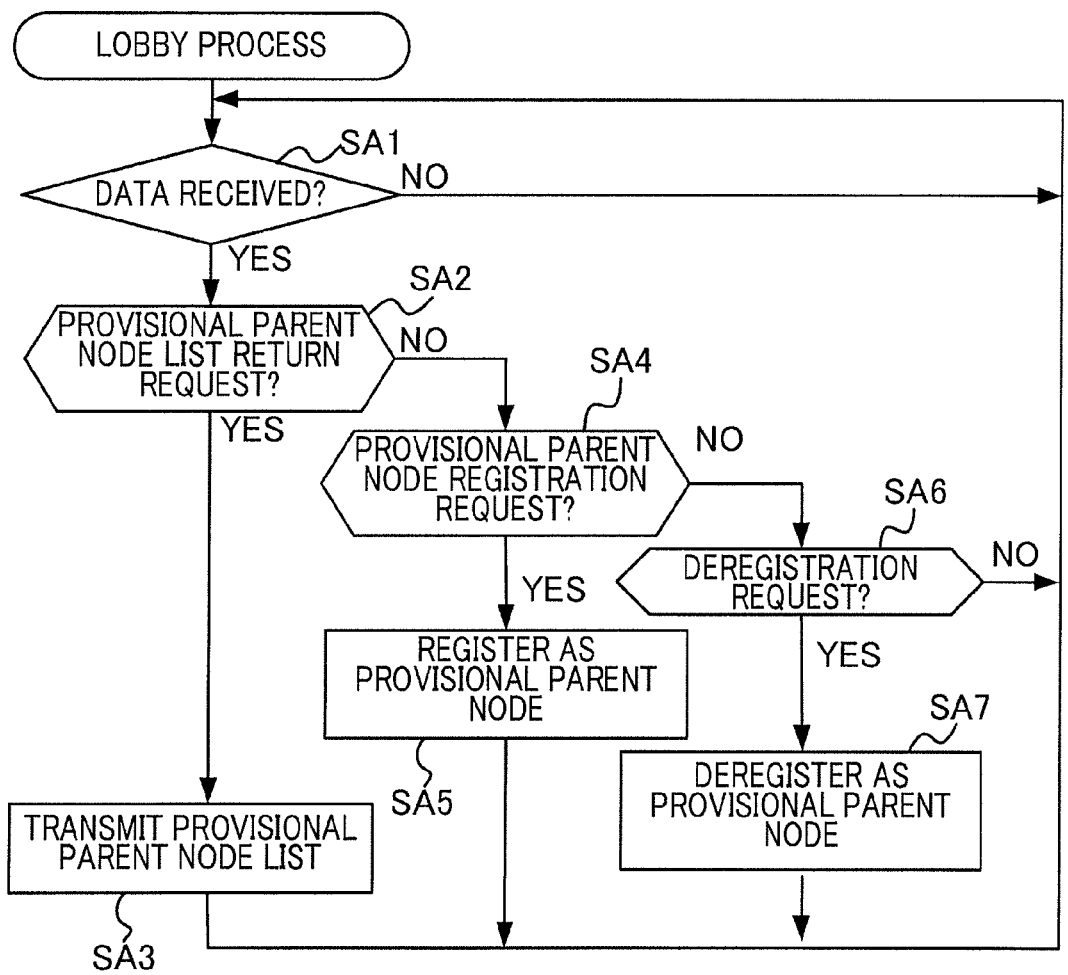
FIG. 6 is a flowchart of a lobby process performed by a processor 41 of matching server device 40.

Lobby Process:

FIG. 6 is a flowchart of a lobby process performed by a processor 41 of matching server device 40. In the lobby process, processor 41 repeats a process of determining whether it has received data from game device 10 until it receives, data from game device 10 (SA1). In a case in which it receives data, and a result of the determination of this process changes to YES, processor 41 determines whether the received data is a provisional parent node list return request requesting return of a provisional parent node list (SA2). In a case in which a result of the determination is YES, processor 41 reads provisional parent node list 441 from rewritable memory 44, for transmission to game device 10 that has transmitted the provisional parent node list return request (SA3), to advance the process to Step SA1.

In a case in which a result of the determination in Step SA2 is NO, processor 41 determines whether the received data is a provisional parent node registration request requesting registration as a provisional parent node (SA4). In a case in which a result of the determination is YES, processor 41 registers game device 10 that has transmitted the provisional parent node registration request as a provisional parent node (SA5). Specifically, processor 41 adds the communication address of this game device 10 to provisional parent node list 441. Processor 41 then advances the process to Step SA1.

In a case in which a result of the determination of Step SA4 is NO, processor 41 determines whether the received data is a deregistration request that requests deregistration as a provisional parent node (SA6). In a case in which a result of the determination is YES, processor 41 erases registration as a provisional parent node of game device 10 that has transmitted this deregistration request (SA7). Specifically, processor 41 deletes the communication address of this game device 10 from provisional parent node list 441. Processor 41 advances the process to Step SA1.

Figure 7:
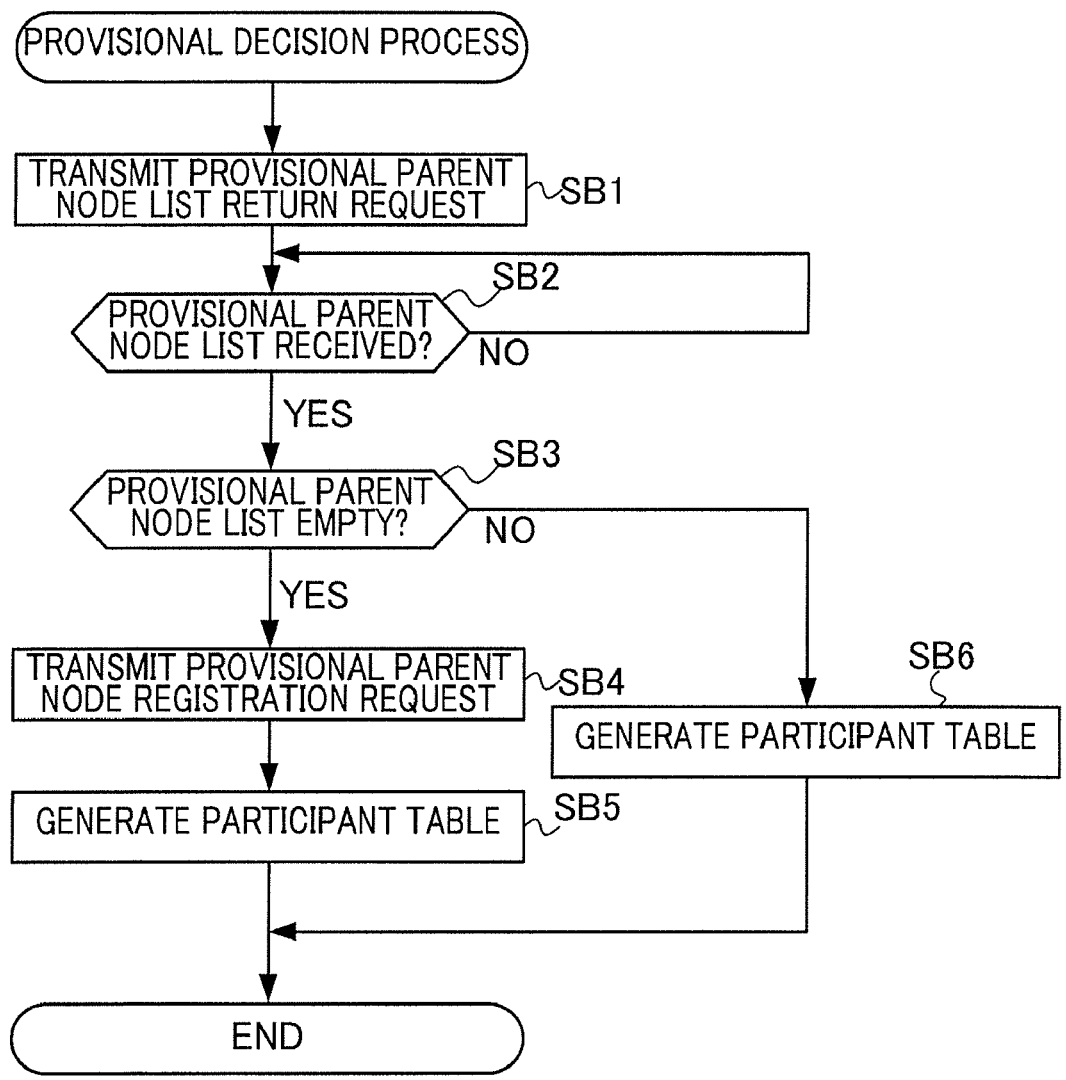
FIG. 7 is a flowchart of a provisional decision process performed by a processor 11 of game device 10.

Provisional Decision Process:

FIG. 7 is a flowchart of a provisional decision process performed by processor 11 of game device 10. In the provisional decision process, processor 11 transmits a provisional parent node list return request (SB1). Subsequently, processor 11 repeats a process of determining whether it has received provisional parent node list 441 from matching server device 40 (SB2) until it receives provisional parent node list 441 from matching server device 40 (SB2). In a case in which it receives provisional parent node list 441, and a result of the determination of this process changes to YES, processor 11 determines whether the received provisional parent node list 441 is empty (SB3). In a case in which a result of the determination is YES, processor 11 transmits a provisional parent node registration request to matching server device 40 (SB4) and generates participant table T4 so that game device 10 of this processor 11 becomes a provisional parent node (SB5). Specifically, rewritable memory 19 secures in its memory area a participant table T4 to store in one record of participant table T4 a communication address of this game device 10 and a flag (for example, flag with the value of 1) indicating a provisional parent node.

On the other hand, in a case in which a result of the determination in Step SB3 is NO, processor 11 does not transmit a provisional parent node registration request to matching server device 40 but generates participant table T4 so that game device 10 of this processor 11 becomes a provisional child node (SB6). Specifically, processor 11 secures participant table T4 in its memory area of rewritable memory 19 and stores in one record of participant table T4 its communication address and a flag (for example, a flag with the value of 0) indicating a provisional child node, whereas processor 11 stores, in another record, a communication address stored in the received provisional parent node list 441 and a flag (for example, a flag with the value of 1) indicating a provisional parent node.

Figure 8:
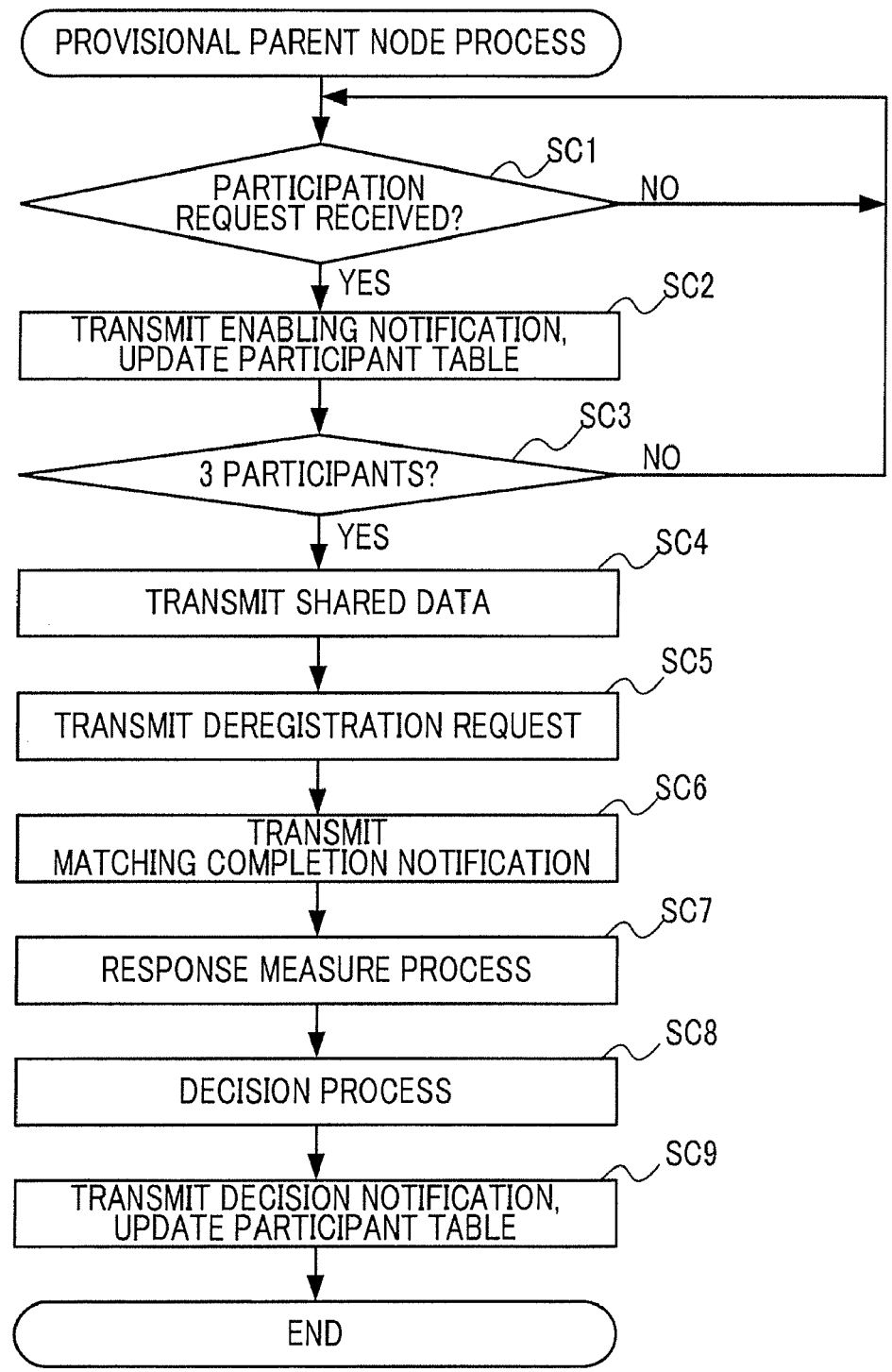
FIG. 8 is a flowchart showing a provisional parent node process performed by processor 11 of game device 10.

Provisional Parent Node Process:

FIG. 8 is a flowchart showing a provisional parent node process performed by processor 11 of game device 10. The provisional parent node process is performed subsequent to the provisional decision process in a case in which there is stored in participant table T4 a communication address of game device 10 of this processor 11 in association with a flag indicating a provisional parent node. In the provisional parent node process, processor 11 repeats a process of determining whether it has received a participation request for requesting participation to a tank game from another game device 10, until it receives a participation request from another game device 10 (SC1). In a case in which processor 11 receives a participation request and a result of the determination of this process turns to YES, processor 11 transmits an enabling acknowledgment indicating permission for participation to game device 10 that has transmitted this participation request, and processor 11 updates participant table T4 so that the transmitter game device 10 is a provisional child node (SC2). Specifically, processor 11 stores in an empty record of participant table T4 a communication address of the transmitter game device 10 and a flag indicating a provisional child node.

Subsequently, processor 11 determines whether the number of participants is three (SC3). Specifically, processor 11 determines whether the number of records in which a communication address and a flag are stored is three in participant table T4. In a case in which a result of the determination is NO, processor 11 advances the process to Step SC1. In a case in which a result of the determination is YES, processor 11 transmits shared data for sharing information of participants to each of participant game devices 10 excluding game device 10 of this processor 11 (SC4). The shared data contains communication addresses of participant game devices 10 excluding game device 10 of this processor 11 and also excluding game device 10 to which the shared information is to be transmitted.

Processor 11 then transmits to matching server device 40 a deregistration request of registration as a provisional parent node (SC5) and transmits, to participant game devices 10 other than game device 10 of this processor 11, a matching completion notification notifying the completion of the matching process (SC6). Subsequently, processor 11 performs a response measurement process for measuring a response time of game device 10 of this processor 11 (SC7). In the response measurement process, in a case in which all participant game devices 10 other than game device 10 of this processor 11 are referred to as other game devices and in which a response time between this game device 10 and each of the other game devices with this game device 10 as an origin is referred to as a response time of this game device 10, processor 11 of this game device 10 measures a response time of this game device 10, to generate measurement data (self data) showing the sum of the measured response times, which will be described later in detail. Furthermore, in the response measurement process in Step SC7, processor 11 receives from the other game devices measurement result notifications notifying their measurement results, each measurement result notification indicating measurement data (other data) showing the sum of response times. Thus, the response measurement process in Step SC7 is a process of collecting response times.

Subsequently, processor 11, based on a result of response measurement process (measurement data), performs a process of determining a parent node (SC8). Specifically, in a case in which, from among the obtained pieces of measurement data, the only data showing the minimum value is self data, processor 11 selects this game device as a parent node;

and in a case in which, from among the obtained pieces of measurement data, the only data piece showing the minimum value is not self data (i.e., other data), processor 11 selects game device 10 having transmitted this only data piece as a parent node. Processor 11 then transmits a decision notification indicating the selected parent node to participant game devices 10 other than itself and updates participant table T4 based on the result (SC9). Specifically, from among flags stored in participant table T4, a flag corresponding to a communication address of game device 10 that has been selected as a parent node will be updated to a flag indicating a parent node (for example, flag with the value of 1), and each of the flags corresponding to other communication address will be updated to a flag indicating a child node (for example, a flag with the value of 0).

Figure 9:
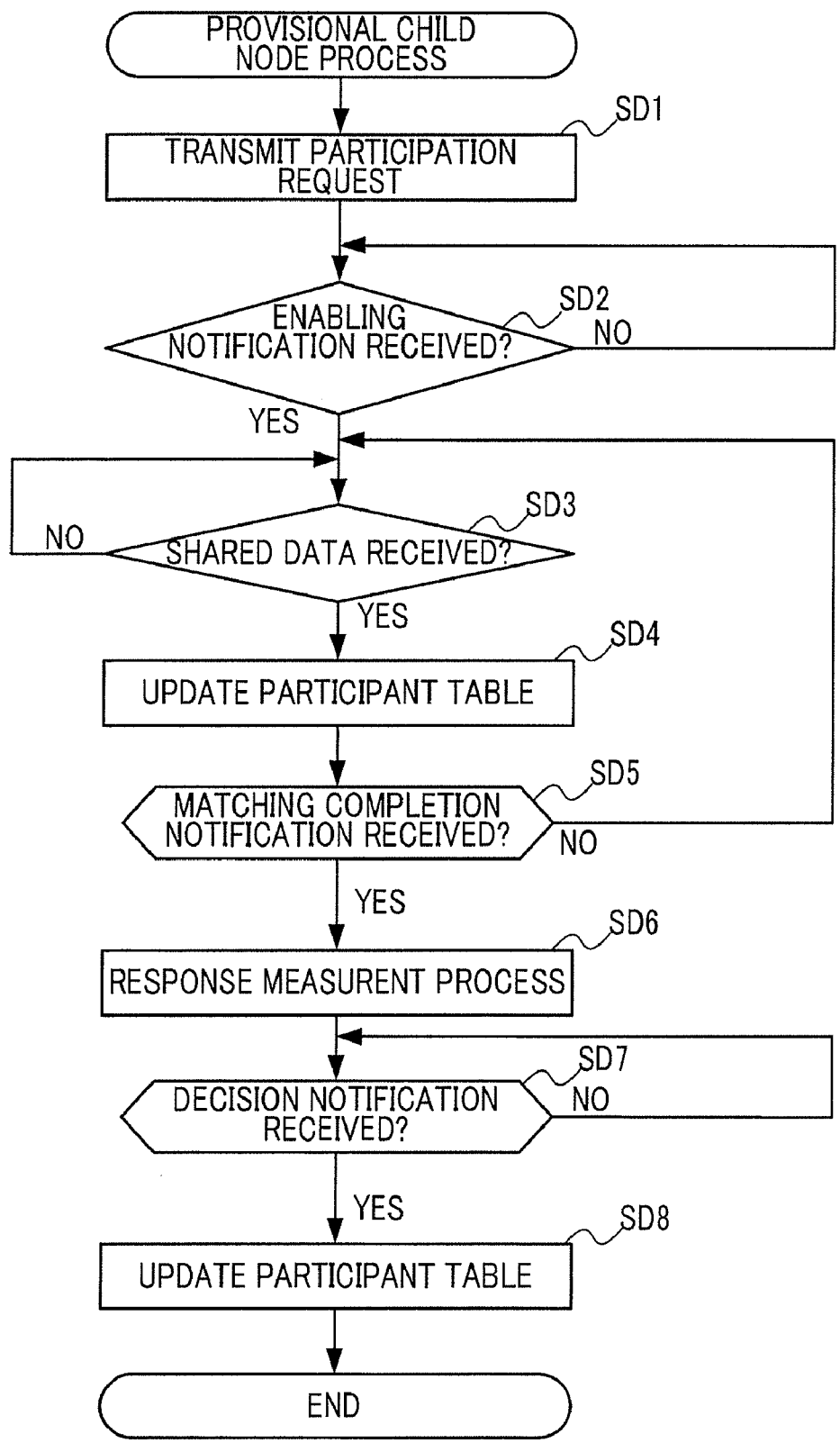
FIG. 9 is a flowchart showing a provisional child node process performed by processor 11 of game device 10.

Provisional Child Node Process:

FIG. 9 is a flowchart showing a provisional child node process performed by processor 11 of game device 10. The provisional child node process is performed subsequent to the provisional decision process in a case in which, in participant table T4, its own communication address is stored in association with a flag indicating a provisional child node. In the provisional child node process, processor 11 transmits a participation request to game device 10 (provisional parent node) of a communication address stored in provisional parent node list 441 received in the provisional decision process (SD1).

Subsequently, processor 11 repeats a process of determining whether it receives an enabling acknowledgment from a provisional parent node until it receives an enabling acknowledgment from a provisional parent node (SD2). In a case in which processor 11 receives an enabling acknowledgment, and then a result of the determination of this process changes to YES, processor 11 repeats a process of determining whether it receives shared data from the provisional parent node until it receives shared data from the provisional parent node (SD3). In a case in which processor 11 receives shared data, and then a result of the determination of this process changes to YES, processor 11 updates participant table T4 based on the received shared data (SD4). Specifically, processor 11 stores, in an empty record of participant table T4, a communication address and a flag indicating a provisional child node contained in the received shared data.

When Step SD4 is completed, processor 11 repeats a process of determining whether it has received a matching completion notification from the provisional parent node until it receives a matching completion notification from the provisional parent node (SD5). When processor 11 receives a matching completion notification, and then a result of the determination of this process changes to YES, processor 11 performs a response measurement process that is the same as that in Step SC7 (SD6). However, in the response measurement process in Step SD6, processor 11 does not receive a measurement result notification from other game devices but instead transmits a measurement result notification containing generated measurement data to game device 10 which is the provisional parent node.

Subsequently, processor 11 repeats a process of determining whether it has received a decision notification from a provisional parent node until it receives a decision notification from the provisional parent node (SD7). When processor 11 receives a decision notification, and then a result of the determination of this process changes to YES, processor 11 updates participant table T4 based on the received decision notification (SD8). Specifically, processor 11 updates, from among flags stored in participant table T4, a flag corresponding to a communication address of game device 10 indicated by the decision notification to a flag indicating a parent node, whereas processor 11 updates a flag not corresponding to a communication address of game device 10 indicated by the decision notification to a flag indicating a child node.

Parent Node Process and Child Node Process:

Both a parent node process and a child node process are processes for causing a participant to play a tank game. Processor 11 of game device 10, which is a parent node from among participant game devices 10, performs a parent node process, and each processor 11 of game devices 10 that are child nodes performs a child node process, and situation data of these game devices 10 are repeatedly updated, whereby the tank game progresses.

Processor 11 that is executing the parent node process generates operation data corresponding to an operation signal output from input unit 14, decides the situation of the tank game based on the generated operation data and operation data received through communication interface 17, transmits situation data showing the decided situation to game devices 10 that are child nodes via communication interface 17, and stores situation data in rewritable memory 19. This storage is overwriting of previous situation data. Furthermore, processor 11 that is executing a parent node process uses the situation data stored in rewritable memory 19 to display image BF and situation indicator IND.

Processor 11 that is executing a child node process generates operation data corresponding to an operation signal output from input unit 14 and transmits this operation data to game device 10 that is a parent node through communication interface 17. Furthermore, processor 11 that is executing a child node process stores situation data received through communication interface 17 in rewritable memory 19. This storage is overwriting of previous situation data. Furthermore, processor 11 that is executing a child node process uses the situation data stored in rewritable memory 19 to display image BF and situation indicator IND.

Operational Example:

FIGS. 10A to 12 are sequence charts showing operational examples of game system 100. In this operational example, processor 11 of a game device 10 (game device 10A) sited at venue A first transmits a provisional parent node list return request to matching server device 40; processor 11 of a game device 10 (game device 10B) sited at venue B subsequently transmits the same request to the server device; and processor 11 of a game device 10 (game device 10C) sited at venue C subsequently transmits the same request to the server device; and game device 10B will be a parent node of this tank game. In the following, detailed description will be given of the operational example. It is to be noted that processor 41 of matching server device 40 has already executed the lobby process.

Figure 10A:
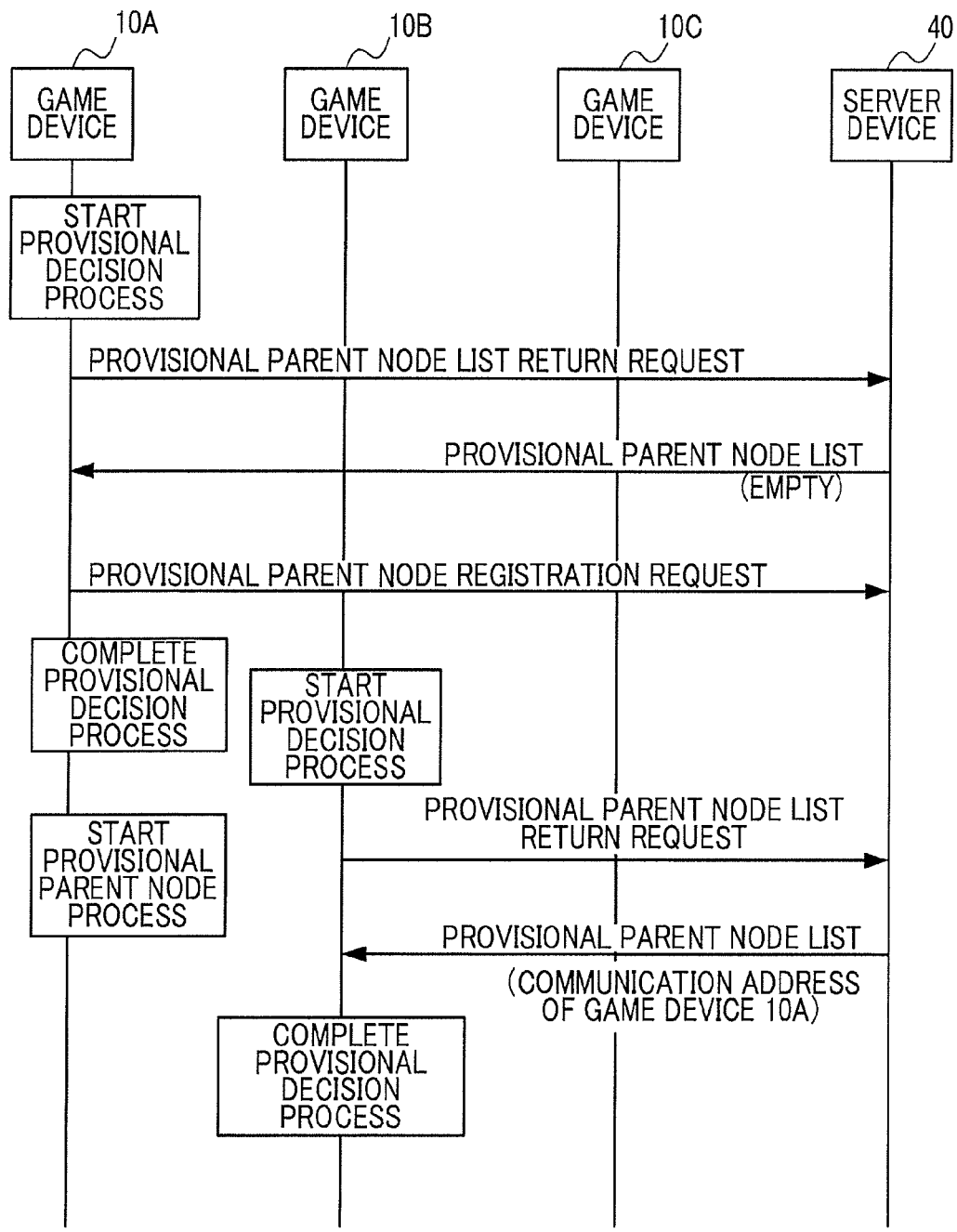
FIG. 10A is a sequence chart showing an operational example of game system 100.

As shown in FIG. 10A, processor 11 of game device 10A first initiates a provisional decision process and transmits a provisional parent node list return request to matching server device 40. Processor 41 of matching server device 40, having received this provisional parent node list return request, reads from rewritable memory 44 provisional parent node list 441, for transmission to game device 10A. Since this provisional parent node list 441 is empty, processor 11 of game device 10A, having received this provisional parent node list 441, transmits a provisional parent node registration request, generates the participant table to end the provisional decision process, and then starts a provisional parent node process. One of three participants of the tank game is thus decided. Processor 41 of matching server device 40, having received the provisional parent node registration request, adds to provisional parent node list 441 stored in rewritable memory 44 a communication address of game device 10A that has transmitted the provisional parent node registration request.

Subsequently, processor 11 of game device 10B starts a provisional decision process and transmits a provisional parent node list return request to matching server device 40. Processor 41 of matching server device 40, having received this provisional parent node list return request, reads, from rewritable memory 44, provisional parent node list 441, for transmission to game device 10B. Since this provisional parent node list 441 contains a communication address of game device 10A, processor 11 of game device 10B having received provisional parent node list 441 generates the participant table before completing the provisional decision process and starts a provisional child node process (FIG. 10B).

Subsequently, as shown in FIG. 10B, processor 11 of game device 10C starts a provisional decision process and transmits a provisional parent node list return request to matching server device 40. As a result, the same operation as the above-described operation for game device 10B is performed for game device 10C.

On the other hand, processor 11 of game device 10B having started the provisional child node process transmits a participation request to game device 10A. This transmission is performed using a communication address contained in provisional parent node list 441 that was received in the provisional decision process. Processor 11 of game device 10A, having received the participation request, transmits an enabling acknowledgment to game device 10B. Processor 11 of game device 10B, having received this enabling acknowledgment, waits for a receipt of shared data and a matching completion notification from game device 10A. Two of the three participants of the tank game are thus decided.

Processor 11 of game device 10C, having started a provisional child node process, transmits a participation request to game device 10A. As a result, the same operation as the above-described operation for game device 10B is performed for game device 10C, and all of the three participants of the tank game are decided.

Subsequently, processor 11 of game device 10A transmits shared data containing a communication address of game device 10B to game device 10C and also transmits shared data containing a communication address of game device 10C to game device 10B. At each of game device 10B and 10C, processor 11 receives shared data and stores, in an empty record of participant table T4 stored in rewritable memory 19, a communication address and a flag indicating the provisional child node contained in the received shared data.

As a result of the above operation, what are stored in participant tables T4 at game devices 10A to 10C become identical to one another. Specifically, each participant table T4 stores a communication address of game device 10A and a flag indicating a provisional parent node in association with each other; a communication address of game device 10B and a flag indicating a provisional child node in association with each other; and a communication address of game device 10C and a flag indicating a provisional child node in association with each other.

Subsequently, processor 11 of game device 10A transmits a deregistration request to matching server device 40. Processor 41 of matching server device 40, having received the deregistration request, deletes a communication address of game device 10A that has transmitted the deregistration request from provisional parent node list 441 in rewritable memory 44. Processor 11 of game device 10A then transmits a matching completion notification to game devices 10B and 10C to start a response measurement process (SC7). On the other hand, each processor 11 of game devices 10B and 10C having received this matching completion notification starts a response measurement process (SD6).

The subsequent operation is as shown in FIG. 11. In this figure, arrows indicating transmissions of data between game devices are tilted, considering transmission delay.

Processor 11 of game device 10A transmits, to game device 10B, a response speed measurement request requesting transmission of a response speed measurement response for measuring response speed. Processor 11 of game device 10B having received this response speed measurement request transmits a response speed measurement response to game device 10A. The response speed measurement response is received by processor 11 of game device 10A. On this occasion, processor 11 of game device 10A measures time since it transmitted the above response speed measurement request until it receives the above response speed measurement response as a response time (TAB) with respect to game device 10B with game device 10A as an origin. A process that is the same as this measurement process is performed for game device 10C and a response time (TAC) for game device 10C with game device 10A as an origin is measured. Thus, a response time with respect to game device 10A will be measured. Processor 11 of game device 10A then generates measurement data indicating the sum of response times with respect to game device 10A (TAB+TAC) and stores the measurement data as self data in rewritable memory 19.

At game device 10B, through a process that is the same as the above measurement process, a response time (TBA) for game device 10A with game device 10B as an origin and a response time (TBC) for game device 10A with game device 10B as an origin are measured. Thus, response times for game device 10B are measured. Processor 11 of game device 10B then generates measurement data indicating the sum of a response time for game device 10B (TBA+TBC) and transmits, to game device 10A which is a provisional parent node, a measurement result notification containing the measurement data. This measurement result notification is received by processor 11 of game device 10A.

At game device 10C, through a process that is the same as the above measurement process, a response time (TCA) for game device 10A with game device 10C as an origin and a response time (TCB) for game device 10B with game device 10C as an origin are measured. Thus, response times for game device 10C are measured. Processor 11 of game device 10C then generates measurement data indicating the sum of a response time for game device 10C (TCA+TCB) and transmits, to game device 10A which is a provisional parent node, a measurement result notification containing the measurement data. This measurement result notification is received by processor 11 of game device 10A.

The response measurement process is thus completed. Subsequently, processor 11 of game device 10A performs a decision process. Specifically, from among obtained pieces of measurement data, the only measurement data showing the minimum value is self data, game device 10A is selected as a parent node, and if it is not self data, game device 10 having transmitted the only measurement data showing the minimum value will be a parent node. In this operational example, the only measurement data showing the minimum value is measurement data transmitted from game device 10B, and therefore, game device 10B will be the parent node. Accordingly, processor 11 of game device 10A, from among flags stored in participant table T4 in rewritable memory 19, updates a flag corresponding to a communication address of game device 10B that was just selected as the parent node to a flag showing the parent node and updates flags corresponding to other communication address to flags showing child nodes.

Processor 11 of game device 10A then transmits, to game devices 10B and 10C, a decision notification containing a communication address of game device 10B as shown in FIG. 12. Processor 11 of game device 10A then completes the provisional parent node process, to start a process (child node process) corresponding to a flag that is stored in participant table T4 in association with the communication address of game device 10A. On the other hand, processor 11 of game device 10B that has received the decision notification updates participant table T4 in rewritable memory 19 in accordance with the decision notification. The result of this update will be the same as the result of the update at game device 10A. Subsequently, processor 11 of game device 10B completes the provisional child node process to start a process (parent node process) corresponding to a flag that is stored in participant table T4 in association with the communication address of game device 10B. The same process as this is also performed at game device 10C. However, a process that processor 11 of game device 10C will start will be a child node process.

In the subsequent process, a parent node process is executed at game device 10B, and a child node process is executed at each of game devices 10A and 10C. As a result, an operation such as the following example is repeated in game system 100. In this example, it is assumed that an operation signal is output from input unit 14 at game devices 10A to 10C. Each processor 11 of game devices 10A and 10C that are child nodes then generates operation data in accordance with the output operation signal, to transmit the operation data to game device 10B that is a parent node. These pieces of operation data are received by processor 11 of game device 10B. That is, all pieces of operation data are assembled at game device 10B that is the parent node. Subsequently, processor 11 of game device 10B determines, based on the operation data, the situation of the tank game, stores situation data indicating this situation in its rewritable memory 19 and transmits the situation data to game devices 10A and 10C. The situation data is received by each processor 11 of game devices 10A and 10C, and the situation data is stored in rewritable memory 19. Therefore, situation data that shows the latest situation is shared by game device 10A to 10C. Subsequently, each processor of game devices 10A to 10C uses the shared situation data to display image BF and situation indicator IND. As a result, images showing the latest situation are displayed on screen 151 of display 15 at game devices 10A to 10C.

Summary:

As has been described above, according to game system 100, since game device 10 for which the sum of response times is the minimum is selected as a parent node, transmission delay (accumulated value) of data from a child node via the parent node to another child node becomes the shortest. Furthermore, the time obtained by averaging transmission delays of data from a child node via the parent node to the same child node for the two child nodes becomes the shortest. Therefore, a communication delay that affects the progress of the tank game can be reduced. It is to be noted that, in the above embodiment, unprocessed operation data that is a type of game data is never passed from the parent node to the child nodes, but situation data that reflects the operation data is passed from the parent node to the child nodes. Therefore, one can say that operation data is data that is passed from a child node via the parent node to another child node while changing forms.

Second Embodiment

Figure 13:
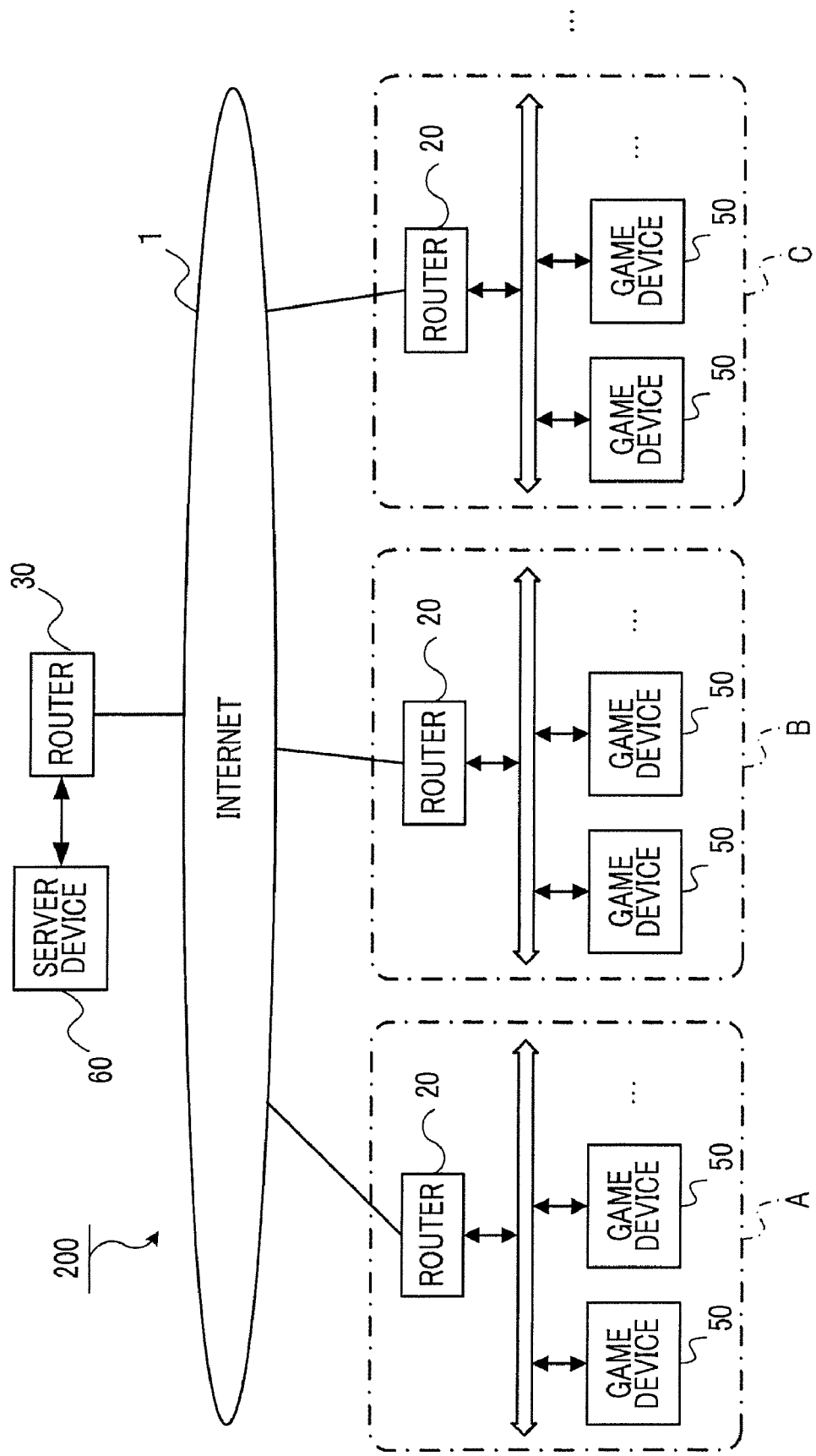
FIG. 13 is a block diagram showing an overall configuration of a game system 200 according to a second embodiment of the present invention.

FIG. 13 is a block diagram showing an overall configuration of a game system 200 according to a second embodiment of the present invention. Game system 200 differs from game system 100 in that it has a game device 50 in place of game device 10 and in that it has a matching server device 60 in place of matching server device 40.

Figure 14:
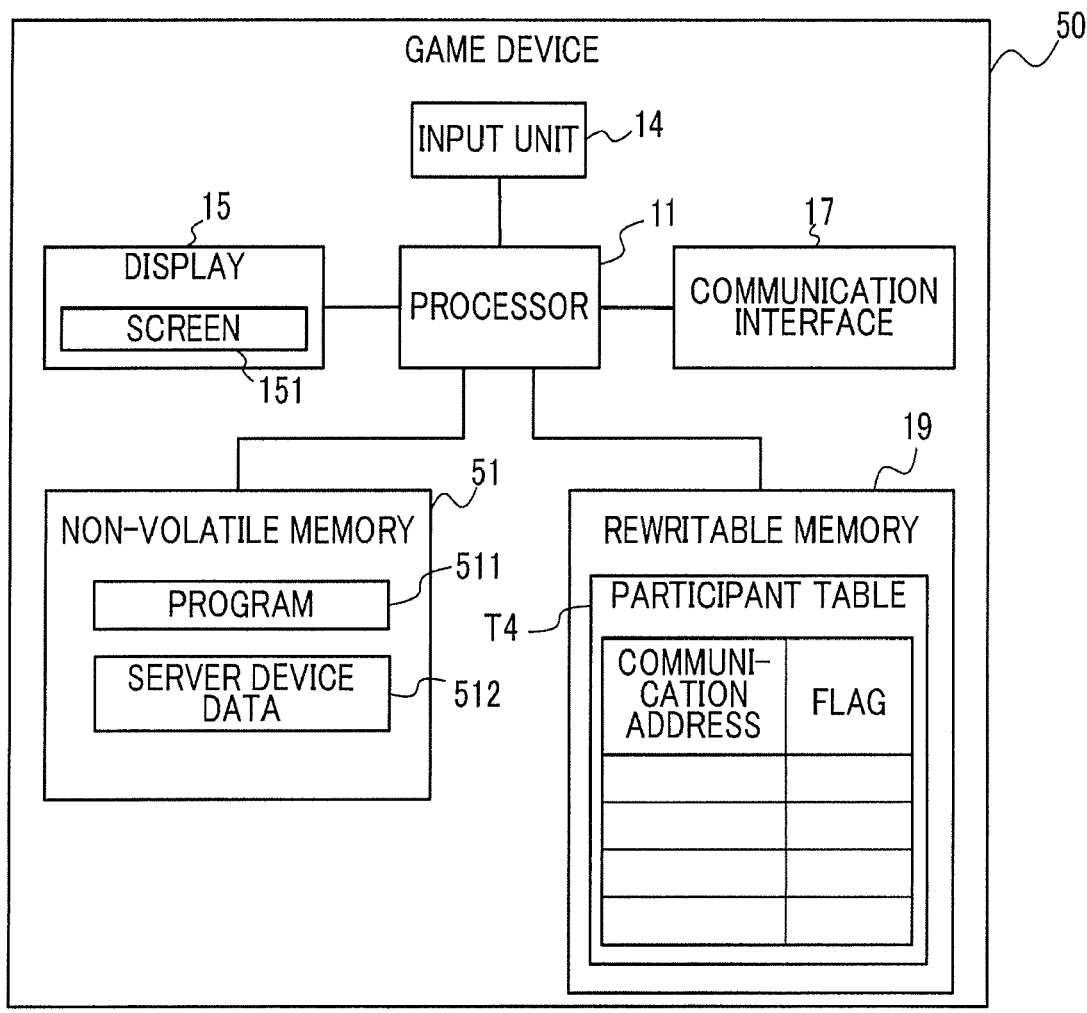
FIG. 14 is a block diagram showing a configuration of a game device 50 included in game system 200.

Game Device 50:

FIG. 14 is a block diagram showing a configuration of a game device 50. Game device 50 differs from game device 10 in that it has a non-volatile memory 51 in place of non-volatile memory 18. Non-volatile memory 51 is, for example, a ROM and stores a program 511 and server device data 512. Program 511 is executed by processor 11, thereby causing game device 50 to perform various processes (a client process, a parent node process, and a child node process, which will be described later). In the following description, a process performed by processor 11 is performed using program 511. Server device data 512 is data required for obtaining a communication address of matching server device 60.

Figure 15:
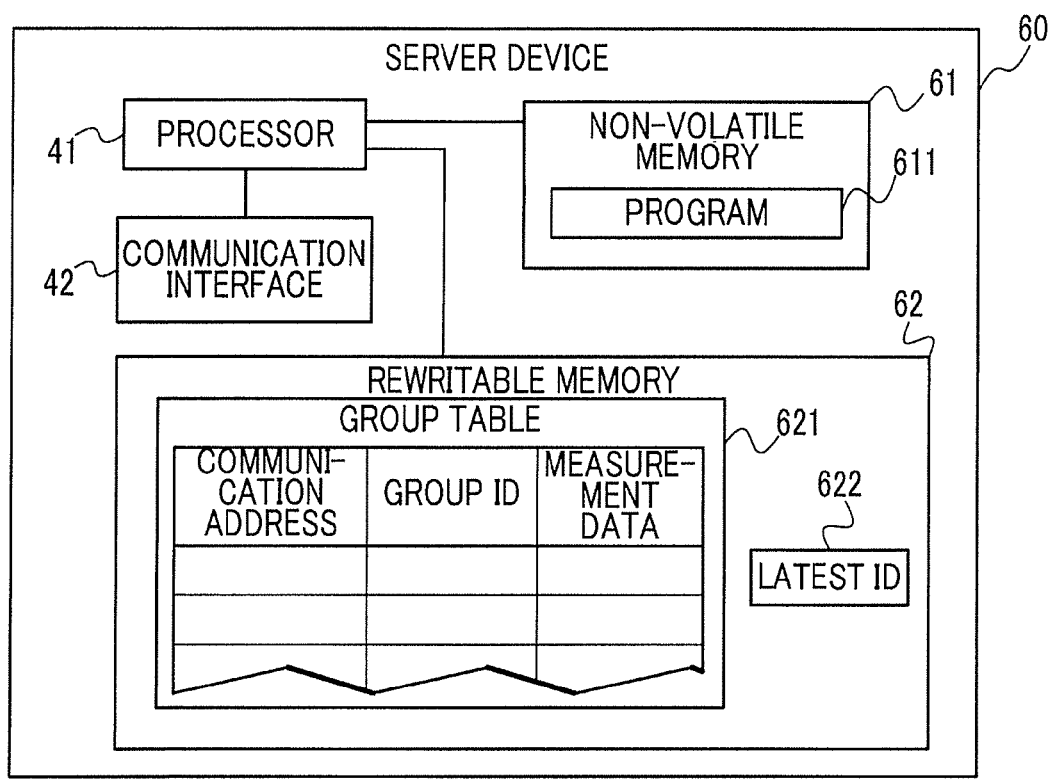
FIG. 15 is a block diagram showing a configuration of a matching server device 60 included in game system 200.

Matching Server Device:

FIG. 15 is a block diagram showing a configuration of matching server device 60. Matching server device 60 differs from matching server device 40 in that it has a non-volatile memory 61 in place of non-volatile memory 43 and in that it has a rewritable memory 62 in place of rewritable memory 44. Non-volatile memory 61 is, for example, a ROM and a hard disk. ROM stores an IPL, and the hard disk stores program 611. Program 611 is executed by processor 41, thereby causing matching server device 60 to perform the server process (described below). In the following description, a process performed by processor 41 is performed using program 611. Non-volatile memory 61 stores a communication address of matching server device 60.

Rewritable memory 62 is, for example, a RAM, and there is secured, in its memory area, a group table 621 that stores data of game devices that belong to one of groups. The number of records in group table 621 is zero when matching server device 60 is turned on and increases as the number of game devices 50 belonging to one of the groups increases. There are stored in each record a communication address of game device 50 belonging to one of the groups and a group ID for identifying a group to which the game device 50 belongs and measurement data indicating the sum of response times for game device 50. Furthermore, rewritable memory 62 stores the latest ID 622, a group ID of a group to which a new game device 50 is to belong. Furthermore, rewritable memory 62 is used for temporary storage of a communication address of a device that has transmitted data that processor 41 has received.

Figure 16:
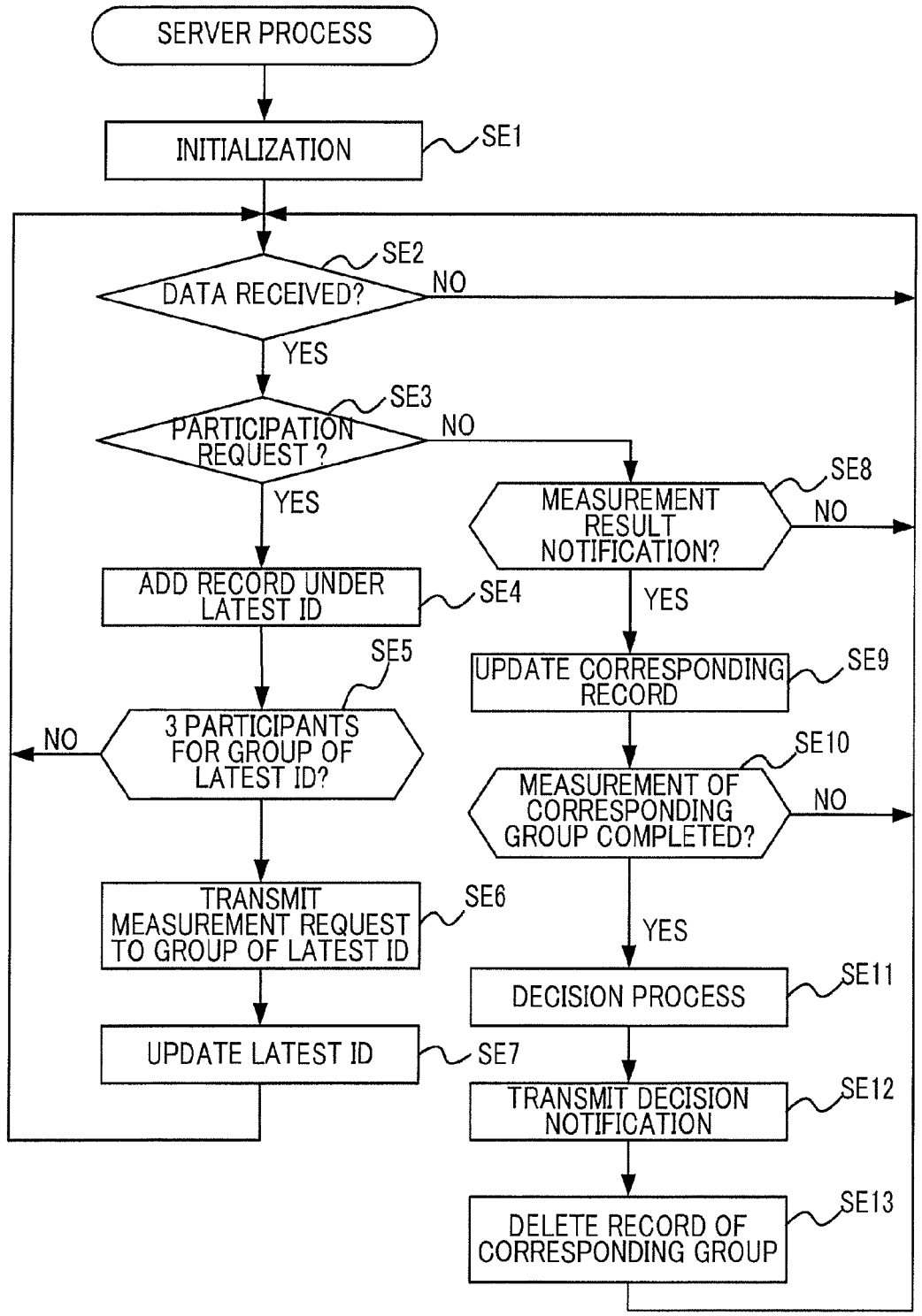
FIG. 16 is a flowchart of a server process performed by processor 41 of matching server device 60.

Server Process:

FIG. 16 is a flow chart of a server process performed by processor 41 of matching server device 60. In the server process, processor 41 first performs initialization (SE1). Specifically, processor 41 stores the latest ID 622 indicating the initial value in rewritable memory 62 and also secures group table 621 in rewritable memory 62. Subsequently, processor 41 repeats a process of determining whether it has received data from game device 50 until it receives data from game device 50 (SE2). When it receives data, and a result of the determination of the process changes to YES, processor 41 determines whether the received data is a participation request (SE3).

In a case in which a result of the determination of Step SE3 is YES, processor 41 uses the latest ID 622 in rewritable memory 62 to add a record in group table 621 of rewritable memory 62 (SE4). In this record, a communication address of game device 50 that has transmitted a participation request is stored as a communication address, and the latest ID 622 is stored as a group ID. Subsequently, processor 41 refers to group table 621 to determine whether the number of participants of a group corresponding to the latest ID 622 is three (SE5). In a case in which a result of the determination is NO, processor 41 advances the process to Step SE2.

In a case in which a result of the determination in Step SE5 changes to YES, processor 41 transmits a measurement request for requesting measurement of a response time to each of game devices 50 belonging to the group of the latest ID 622 (SE6). The measurement request for each game device 50 includes communication addresses of all game devices 50 that belong to the same group as the receiver game device 50 except for the communication address of the receiver game device 50. Subsequently, processor 41 updates the latest ID 622 in rewritable memory 62 (SE7). As a result, the latest ID 622 will change to one that is not yet used. The routine then advances the process to Step SE2.

In a case in which a result of the determination of Step SE3 is NO, processor 41 determines whether the received data is a measurement result notification (SE8). In a case in which a result of the determination is NO, the routine advances the process to Step SE2. In a case in which a result of the determination of Step SE8 is YES, processor 41 updates, from among records of group table 621, a record corresponding to game device 50 that has transmitted the received measurement result notification (SE9). Subsequently, processor 41 determines whether the measurement is completed for a group corresponding to the group ID in the concerned record (SE10). This determination is performed by referring to group table 621, to determine whether measurement data is stored in every single record that has the same group ID as the concerned record. In a case in which a result of the determination is NO, the routine returns to Step SE2.

In a case in which a result of the determination in Step SE10 is YES, processor 41 refers to group table 621 to perform a decision process of selecting a parent node for a group for which the measurement is completed (SE11). Specifically, processor 41 selects game device 50 corresponding to the only piece of data indicating the minimum value from among pieces of measurement data stored in all the records corresponding to the group as a parent node. Subsequently, processor 41 transmits a decision notification indicating the selected parent node to all of the game devices 50 belonging to the same group (SE12). Processor 41 then deletes all the records corresponding to this group from group table 621. The routine then advances to Step SE2.

Figure 17:
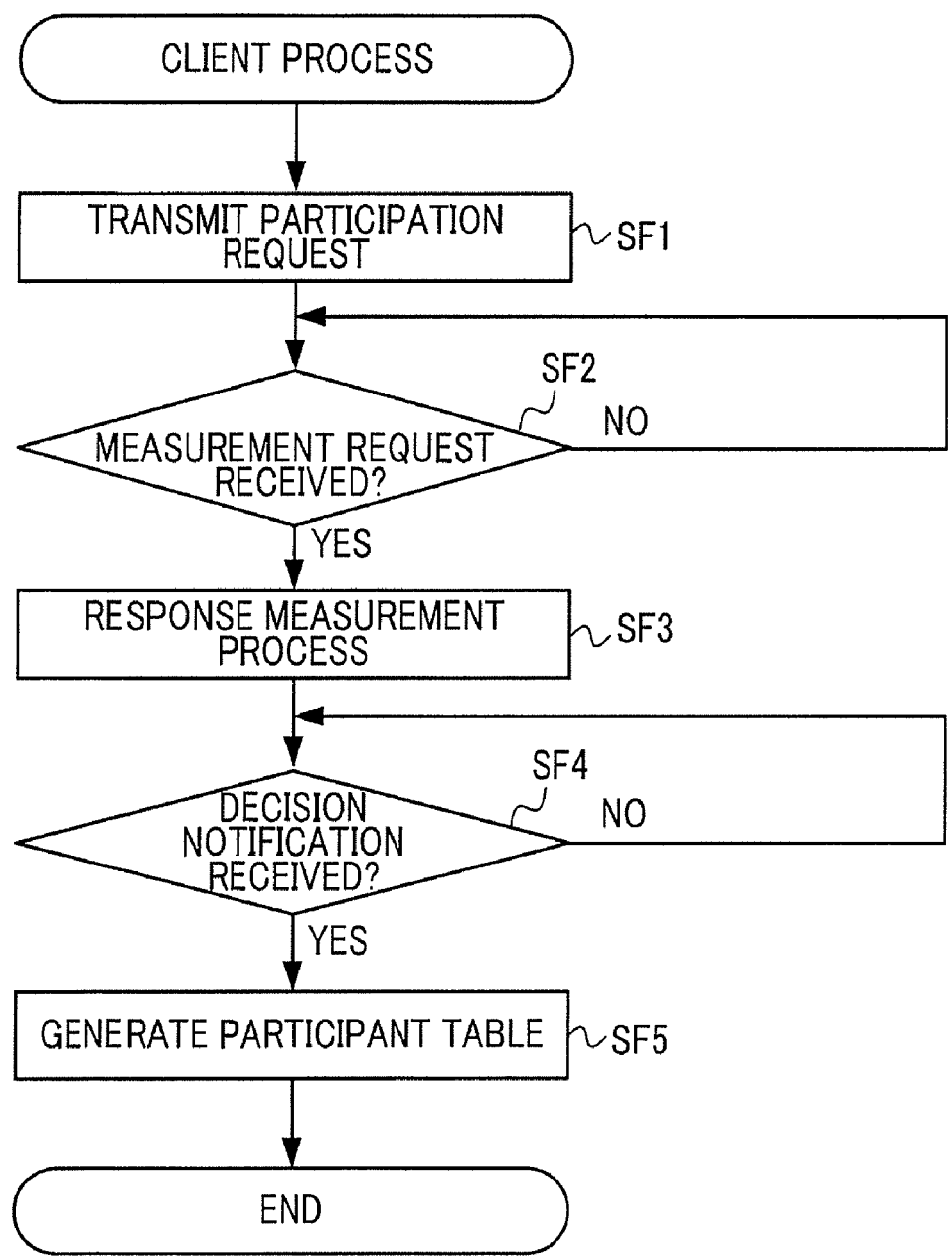
FIG. 17 is a flowchart of a client process performed by processor 11 of game device 50.

Client Process:

FIG. 17 is a flowchart of a client process performed by processor 11 of game device 50. In the client process, processor 11 first transmits a participation request to matching server device 60 (SF1). Processor 11 then repeats a process of determining whether it has received a measurement request from matching server device 60 until it receives a measurement request from matching server device 60 (SF2). Once it receives a measurement request and a result of the determination of this process changes to YES, processor 11 performs a response measurement process that is the same as Step SD6 in FIG. 9 (SF3). However, in the response measurement process of Step SF3, a measurement result notification containing the generated measurement data is transmitted, not to a provisional parent node, but to matching server device 60.

Subsequently, processor 11 repeats a process of determining whether it has received a decision notification from matching server device 60 until it receives a decision notification from matching server device 60 (SF4). Once processor 11 receives a decision notification, and then a result of the determination of this process changes to YES, processor 11 generates participant table T4 based on the received decision notification (SF5). Participant table T4 generated in this process is equivalent to participant table T4 obtained in Step SC9 in FIG. 8 or in Step SD8 in FIG. 9.

Figure 18A:
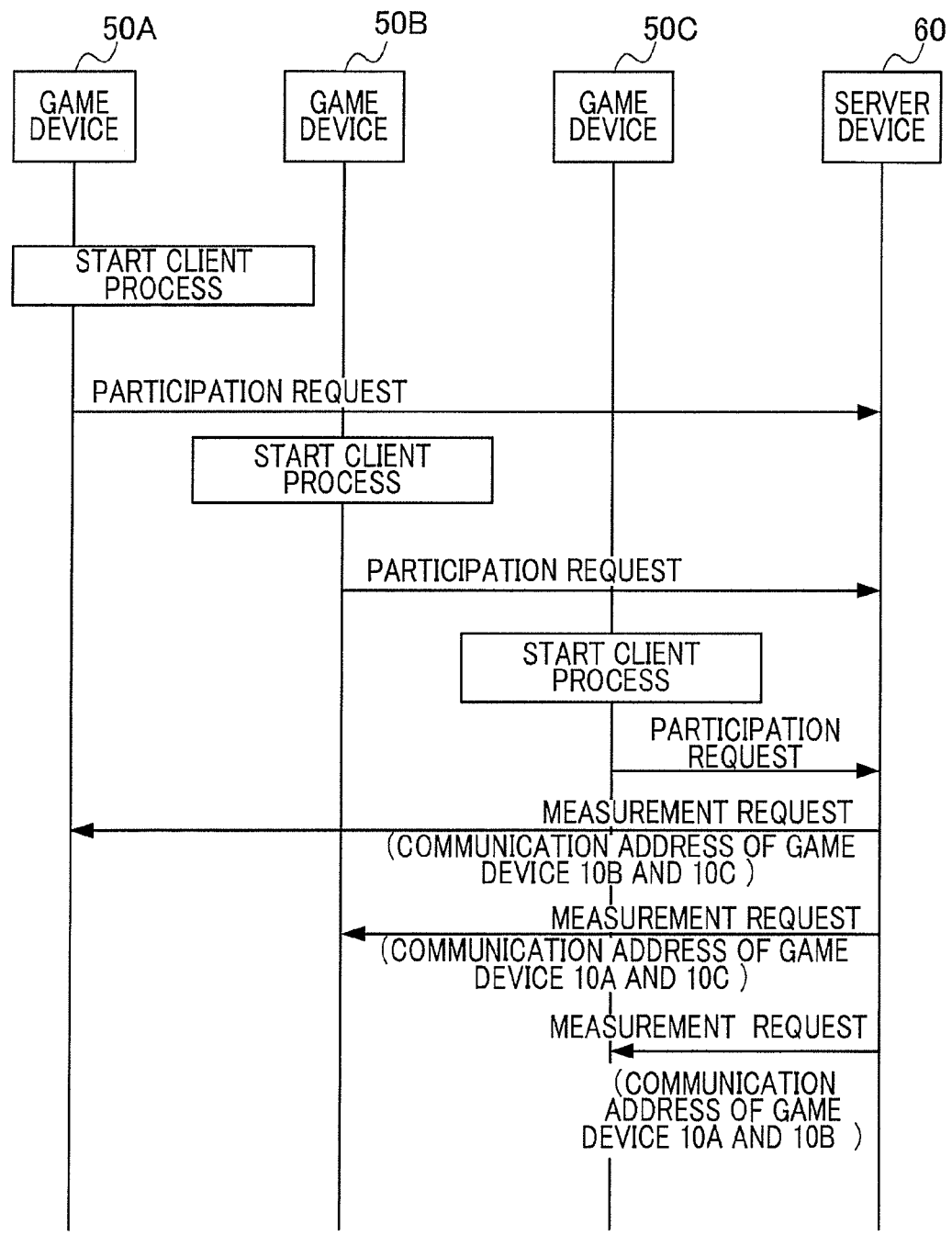
FIG. 18A is a sequence chart showing an operational example of game system 200.
Figure 18B:
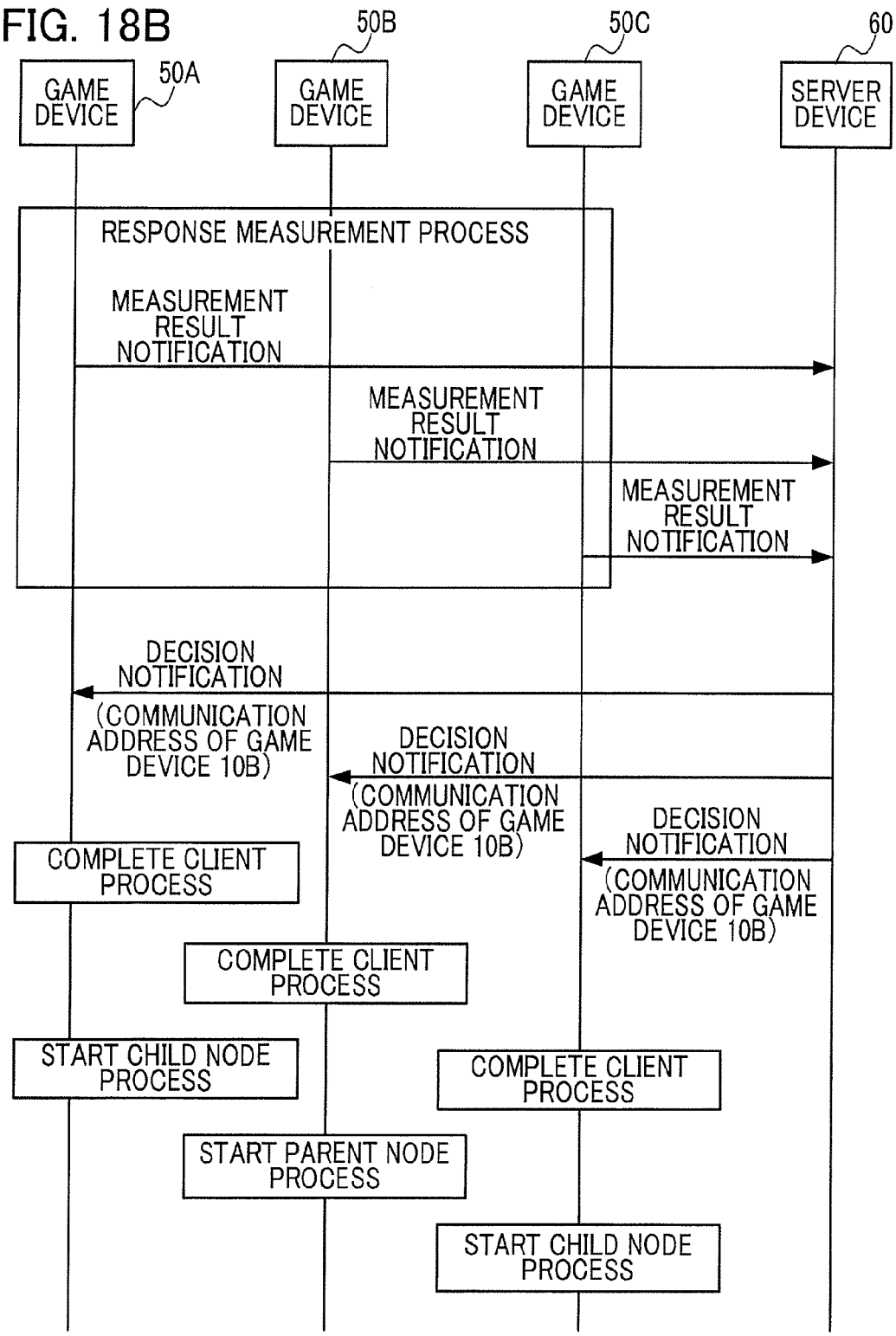
FIG. 18B is a sequence chart showing an operational example of game system 200.

Operational Example:

FIGS. 18A and 18B are sequence charts together showing an operational example of game system 200. As shown in FIG. 18A, in this operational example, processor 11 of a game device 50 (game device 50A) sited in venue A first starts a client process and transmits a participation request to matching server device 60. Subsequently, processor 11 of a game device 50 (game device 50B) sited at venue B starts a client process and transmits a participation request to matching server device 60. Subsequently, processor 11 of a game device 50 (game device 50C) sited at venue C starts a client process and transmits a participation request to matching server device 60.

Processor 41 of matching server device 60 has already executed a server process, and when it receives a participation request from game device 50C, processor 41 transmits, to each of game devices 50A to 50C that belong to a group under the latest ID 622, a measurement request for requesting the measurement of a response time. Communication addresses of game devices 50B and 50C are contained in the measurement request for game device 50A; communication addresses of game devices 50A and 50C are contained in the measurement request for game device 50B; and communication addresses of game devices 50A and 50B are contained in the measurement request for game device 50C.

As shown in FIG. 18B, each processor 11 of game devices 50A to 50C having received the measurement request performs a response measurement process. As a result of the response measurement process, in each of game devices 50A to 50C, measurement data indicating the sum of response times of the concerned game device 50 is generated. Then each processor 11 of game devices 50A to 50C transmits to matching server device 60 a measurement result notification containing the generated measurement data. Processor 41 of matching server device 60 that has received these pieces of measurement data performs a decision process. Specifically, game device 50 (game device 50B in this case) that has transmitted the only piece of measurement data that indicates the minimum value from among the pieces of received measurement data will be a parent node. Subsequently, processor 41 of matching server device 60 transmits, to game devices 50A to 50C, a decision notification containing a communication address of game device 50B that has been decided as a parent node.

Each processor 11 of game devices 50A to 50C having received the above decision notification generates participant table T4 based on the received decision notification. In the subsequent process, processor 11 of game device 50B refers to participant table T4 to start a parent node process, whereas processor 11 of game device 50A refers to participant table T4 to start a child node process. Similarly, processor 11 of game device 50C refers to participant table T4 to start a child node process.

As is obvious from the foregoing description, the same effects as game system 100 are also attainable according to game system 200.

Third Embodiment

Figure 19:
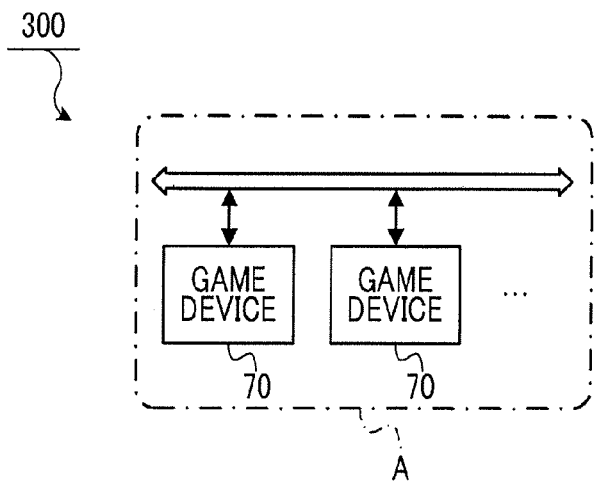
FIG. 19 is a block diagram showing an overall configuration of a game system 300 according to a third embodiment of the present invention.

FIG. 19 is a block diagram showing an overall configuration of a game system 300 according to a third embodiment of the present invention.

Game system 300 differs from game system 100 in that this is a closed system only at a single venue A. Therefore, game system 300 has only three or more game devices 70 each being connected to a LAN of venue A.

Figure 20:
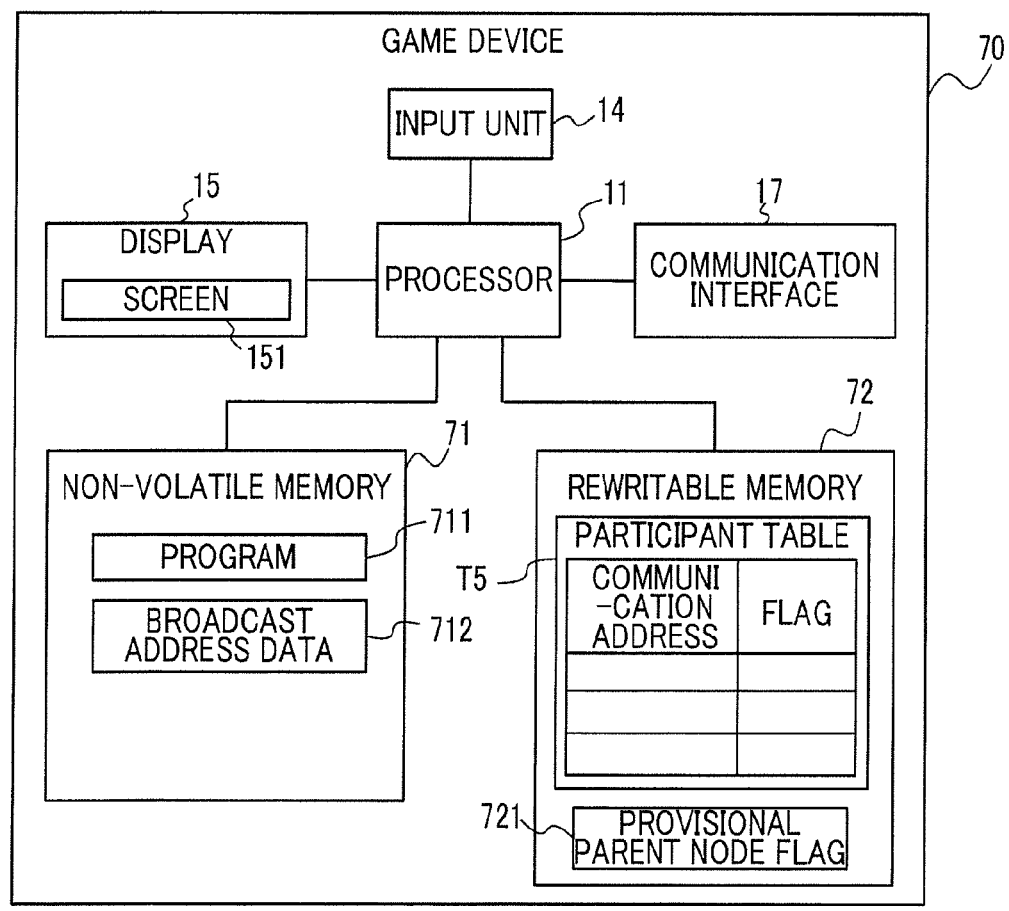
FIG. 20 is a block diagram showing a configuration of a game device 70 included in game system 300.

Game Device 70:

FIG. 20 is a block diagram showing a configuration of a game device 70. Game device 70 differs from game device 10 in that it has a non-volatile memory 71 in place of non-volatile memory 18 and a rewritable memory 72 in place of rewritable memory 19. Non-volatile memory 71 is, for example, a ROM and an EEPROM (Electronically Erasable and Programmable ROM) and stores a program 711 and broadcast address data 712.

Program 711 is executed by processor 11, thereby causing game device 50 to perform various processes (a provisional decision process, a provisional parent node response process, a provisional parent node process, a provisional child node process, a parent node process, and a child node process, which will be described later). In the following description, a process performed by processor 11 is performed using program 711. Broadcast address data 712 is data containing communication addresses of game devices 70 to which a provisional parent node response request is to be transmitted, the provisional parent node response request for requesting transmission of a provisional parent node response indicating that the transmitter is a provisional parent node, and broadcast address data 712 includes the communication addresses of all game devices 70. Furthermore, rewritable memory 72 is used as a temporary storage of a communication address of a device that has transmitted data that processor 11 has received.

Rewritable memory 72 is, for example, a RAM, and there is reserved in its memory area participant table T5 for storing participant data. Participant table T5 has three records respectively corresponding to participants. In each record, a communication address of participant game device 70 and a flag indicating a type (a parent node or a child node) of the game device 70 are stored. Furthermore, rewritable memory 72 stores provisional parent node flag 721 indicating whether its game device is waiting for a participation request as a provisional parent node. The initial value of provisional parent node flag 721 is a value (for example, 0) that indicates its game device is not waiting for a participation request as a provisional parent node. Furthermore, rewritable memory 72 is used for temporary storage of a communication address of a device that has transmitted data that processor 11 has received. It is to be noted that non-volatile memory 71 or rewritable memory 72 stores a communication address of its game device.

Figure 21:
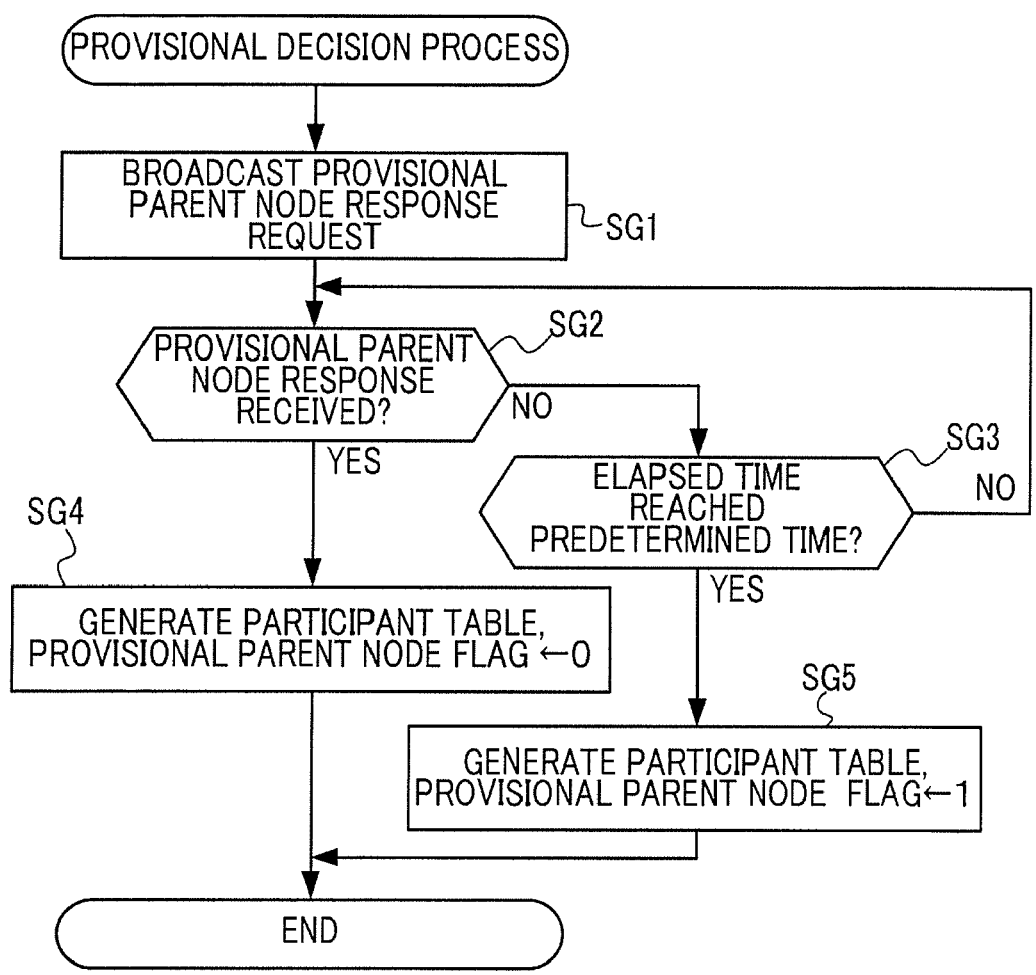
FIG. 21 is a flowchart of a provisional decision process performed by processor 11 of game device 70.

Provisional Decision Process:

FIG. 21 is a flowchart of a provisional decision process performed by processor 11 of game device 70. In the provisional decision process, processor 11 refers to broadcast address data 712 to perform multiple-address transmission of a provisional parent node response request to all the game devices 70 (SG1). Subsequently, processor 11 determines whether it has received a provisional parent node response (SG2), and in a case in which a result of the determination is NO, processor 11 further determines whether an elapsed time since the multiple-address transmission of a provisional parent node response request has reached a predetermined time (SG3). In a case in which a result of the determination is NO, the routine returns to Step SG2.

In a case in which a result of the determination in Step SG2 changes to YES, processor 11 generates participant table T5 that stores its communication address and also changes the value of provisional parent node flag 721 to a value indicating that this device is not waiting for a participation request as a provisional parent node (SG4), to complete the provisional decision process. On the other hand, in a case in which a result of the determination in Step SG3 changes to YES, processor 11 generates participant table T5 that stores its communication address and also changes the value of provisional parent node flag 721 to a value (for example, 1) indicating this device is waiting for a participation request as a provisional parent node (SG5), to complete the provisional decision process.

Figure 22:
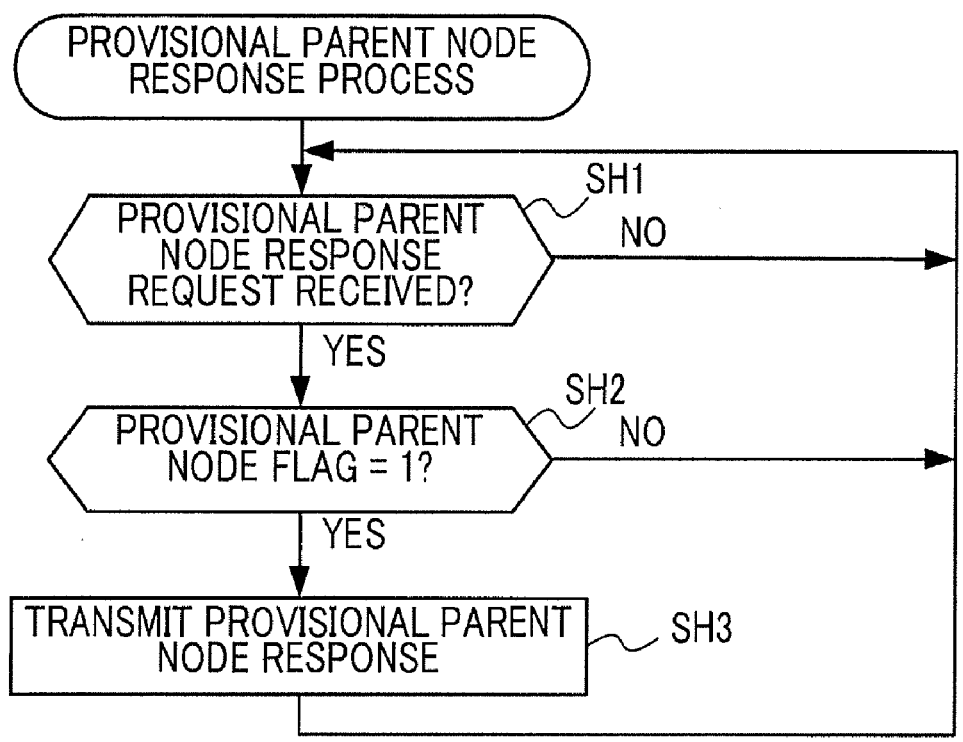
FIG. 22 is a flowchart of a provisional parent node response process performed by processor 11 of game device 70.

Provisional Parent Node Response Process:

FIG. 22 is a flowchart of a provisional parent node response process performed by processor 11 of game device 70. In the provisional parent node response process, processor 11 repeats a process of determining whether it has received a provisional parent node response request until it receives a provisional parent node response request (SH1). In a case in which a result of the determination in this process changes to YES, processor 11 then determines whether a value of provisional parent node flag 721 is a value indicating a provisional parent node (SH2). If a result of the determination changes to NO, the routine returns to Step SH1. In a case in which a result of the determination in Step SH2 is YES, processor 11 transmits a provisional parent node response to game device 70 that has transmitted the received provisional parent node response request (SH3). The routine then returns to Step SH1.

Figure 23:
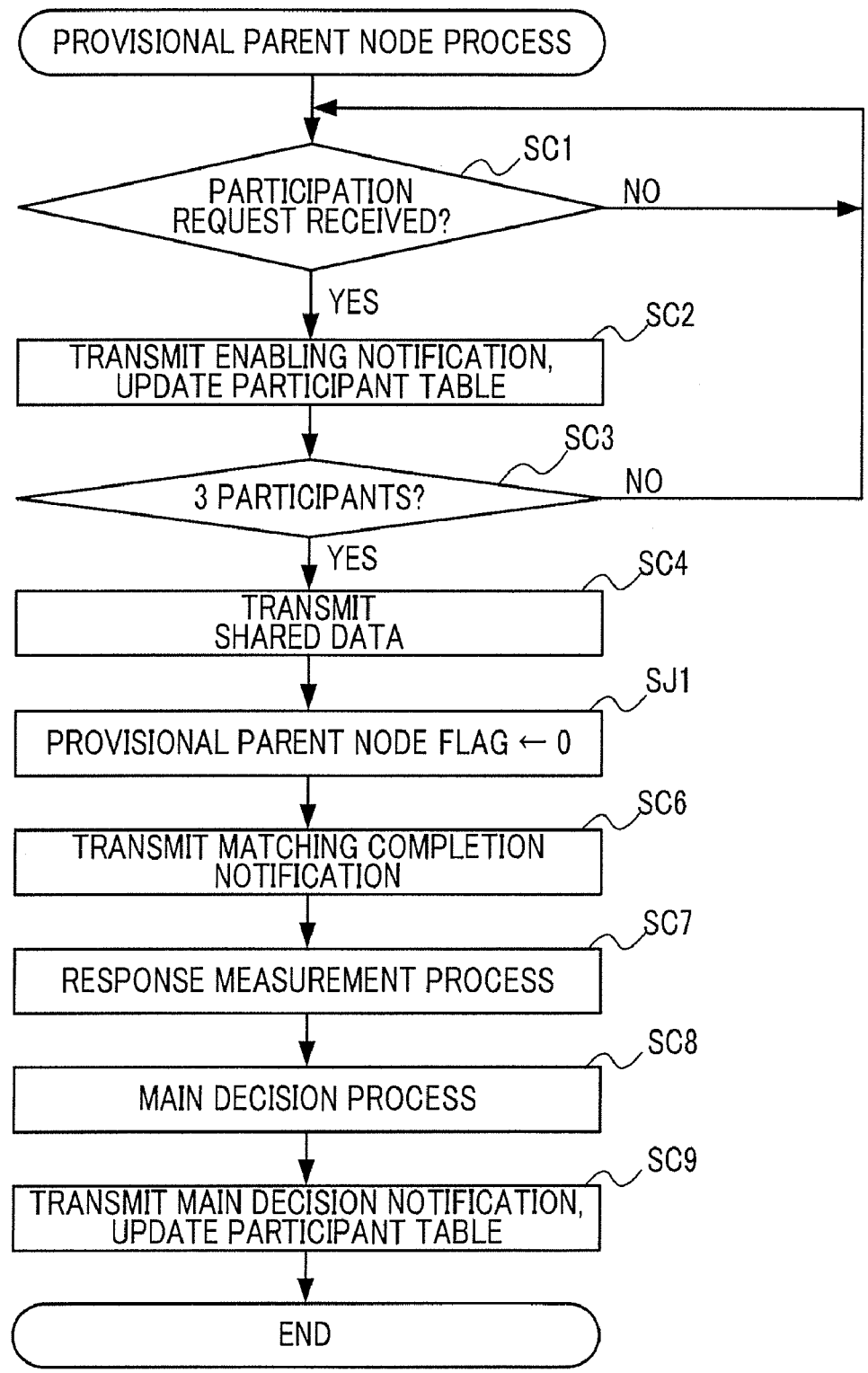
FIG. 23 is a flowchart of a provisional parent node process performed by processor 11 of game device 70.

Provisional Parent Node Process and Provisional Child Node Process:

FIG. 23 is a flowchart of a provisional parent node process performed by processor 11 of game device 70. The provisional parent node process differs from the provisional parent node process in FIG. 8 in that it has a process of changing a value of provisional parent node flag 721 to a value indicating it is not waiting for a participation request as a provisional parent node (SJ1) in place of transmitting a deregistration notification (SC5). The provisional child node process is as shown in FIG. 9. As is obvious from the foregoing description, in the present embodiment, during a period except for a period in which the value of provisional parent node flag 721 that game device 70 has is a value indicating that the game device is waiting for a participation request as a provisional parent node (from Step SG5 in the provisional decision process to Step SJ1 in the provisional parent node process), a provisional parent node response will never be transmitted from this game device 70, and therefore, no participation request will be transmitted to this game device 70. Therefore, according to the present embodiment, even in an environment in which plural groups can coexist, useless transmission of a provisional parent node response and a participation request can be reduced.

As is obvious from the foregoing description, the same effects as game system 100 are attainable according to game system 300.

Modification:

In each of the above embodiments, a game device that is a parent node identifies the damage to each camp, but each game device may identify the damage to its own camp to transmit damage data (game data) indicating the identified damage from a game device that is a child node to a game device that is a parent node. In this case, a parent node may pass three pieces of damage data to each child node, and the proportion of the damage may be identified at each child node, or a parent node may determine the proportion of damage (the situation of the tank game) so that situation data indicating the situation may be passed to each child node. In the former case, damage data is data that is to be passed from a child node via a parent node to another child node without being processed. In the latter case, since situation data that reflects damage data is passed from a parent node to a child node, damage data is data that should be passed from a child node via a parent node to another child node while changing its forms.

In each of the above embodiments, the measurement of each response time is performed by one-time measurement (transmission and reception), but this may be performed by measurements multiple times. In this case, for example, since the average of results of plural-time measurements can be obtained as a result of the measurement, the accuracy in the measurement is enhanced.

In each of the above embodiments, the number of participants is three but may be four or more. Furthermore, the number of participants may be variable. Additionally, a game may be one other than a tank game. Also, the present invention can be applied to any game that is a multiple-player participation type. Furthermore, the present invention can be applied to interactive tasks other than games. An example of such an interactive task is Web chatting.

The invention claimed is:

1. A communication device, wherein the communication device is a first communication device that participates in a group consisting of three or more communication devices, in which group one of the three or more communication devices will become a provisional parent node, the first communication device comprising:
   a communication interface for transmitting to and receiving signals from a network;
   a game data transmitter-receiver that transmits and receives game data using said communication interface; and
   a measurement data generator that measures a response time between said first communication device and a second communication device of the group and a response time between said first communication device and a third communication device of the group, and that generates measurement data indicating a sum of the measured response times, each response time including a transmission delay time between said first communication device as an origin and the second or the third communication devices and a process delay time at the second or the third communication device,
   wherein, in a case in which said first communication device is not the provisional parent node, said first communication device further comprises:
      a measurement data transmitter that transmits the measurement data to another communication device that is the provisional parent node of the group; and
      a decision data receiver that receives decision data indicating which one of the three or more communication devices of the group is a parent node from the provisional parent node,
   wherein, in a case in which said first communication device is the provisional parent node, said first communication device further comprises:
      a measurement data receiver that receives measurement data from the second and the third communication devices of the group;
      a decision data generator that, in a case in which it is determined, based on the measurement data received by said measurement data receiver and the measurement data generated by said measurement data generator, that the measurement data of said first communication device is only data piece that indicates a minimum value from among pieces of measurement data of the communication devices in the group, generates the decision data indicating that said first communication device is the parent node, and otherwise generates the decision data indicating that one of the second and the third communication devices that has transmitted the only data piece is the parent node; and
      a decision data transmitter that transmits the decision data to each of the second and the third communication devices of the group, and wherein said game data transmitter-receiver, in transmitting game data, performs the transmission through a direct communication when said first communication device is the parent node, and performs the transmission through an indirect communication via the parent node when the first communication device is not the parent node.

2. The communication device according to claim 1, further comprising:
   an input unit that receives a player's operation and outputs an operation signal in accordance with the operation;
   a game data generator that generates the game data based on the operation signal; and
   a controller that advances the game based on the game data received by said game data transmitter-receiver.

3. A communication system, comprising:
   three or more communication devices that are in a group;
   wherein one of the communication devices that is in the group becomes a provisional parent node, and
   wherein, for each of the three or more communication devices, a response time between a communication device and another communication device of the group includes a transmission delay time between said communication device as an origin and each of the other communication devices as a destination and a process delay time at the destination communication devices;
   each of the three or more communication devices comprising:
      a communication interface for transmitting and receiving signals to and from a network;
      a game data transmitter-receiver that transmits and receives game data using said communication interface; and
      a measurement data generator that measures a response time between the communication device itself and another communication device of the group, and a response time between the communication device itself and still another communication device of the group, and that generates measurement data indicating a sum of the measured response times,
   wherein, in a case in which said communication device itself is not the provisional parent node, said communication device further comprises:
      a measurement data transmitter that transmits the measurement data to another communication device that is the provisional parent node; and
      a decision data receiver that receives decision data indicating which one of the three or more communication devices is a parent node from the provisional parent node,
   wherein, in a case in which said communication device itself is the provisional parent node, said communication device further comprises:
      a measurement data receiver that receives measurement data from other communication devices of the group;
      a decision data generator that, in a case in which it is determined, based on the measurement data received by said measurement data receiver and the measurement data generated by said measurement data generator, that the measurement data of said communication device itself is only data piece that indicates a minimum value from among pieces of measurement data of the communication devices in the group, generates decision data indicating that said communication device itself is the parent node, and otherwise generates decision data indicating that one of the other communication devices that has transmitted the only data piece is the parent node; and a decision data transmitter that transmits the decision data to each of the other communication devices of the group, and wherein said game data transmitter-receiver, in transmitting game data, performs the transmission through a direct communication when said communication device itself is the parent node, and performs the transmission through an indirect communication via the parent node when said communication device itself is not the parent node.

4. A communication system comprising:

a server device and three or more communication devices that are in a group, wherein for each of the three or more communication devices, a response time between a communication device and another communication device of the group includes a transmission delay time between said communication device as an origin and each of the other communication devices as a destination and a process delay time at the destination communication device, each of the three or more communication devices comprising:

a communication interface for transmitting to and receiving signals from a network;

a game data transmitter-receiver that transmits and receives game data using said communication interface;

a measurement data generator that measures a response time between a communication device itself and another communication device of the group and a response time between the communication device itself and still another communication device of the group, and that generates measurement data indicating a sum of the measured response times, a measurement data transmitter that transmits the measurement data to said server device; and a decision data receiver that receives, from said server device, decision data indicating which one of the three or more communication devices of the group is a parent node, wherein said server device receives measurement data from the three or more communication devices, and transmits to each of the three or more communication devices, a piece of the decision data indicating, as the parent node, a communication device that has transmitted a piece of the measurement data having a minimum value, and wherein said game data transmitter-receiver, in transmitting game data, performs the transmission through a direct communication when said communication device itself is the parent node, and performs the transmission through an indirect communication via the parent node when said communication device itself is not the parent node.

5. A communication system according to claim 4, wherein the three or more communication devices comprises four or more communication devices, and wherein each of the four or more communication devices can belong to the group.

6. The A communication system according to claim 4, wherein each of said communication devices in the group comprises:

an input unit that receives a player's operation and outputs an operation signal in accordance with the operation;

a game data generator that generates the game data based on the operation signal; and a controller that advances the game based on game data received by said game data transmitter-receiver.

7. A non-transitory computer readable medium encoded with instructions comprising a computer program for causing a communication device to function as:

wherein the communication device is a first communication device that participates in a group consisting of three or more communication devices, in which group, one of the three or more communication devices will become a provisional parent node, a communication interface for transmitting to and receiving signals from a network;

a game data transmitter-receiver that transmits and receives game data using said communication interface; and a measurement data generator that measures a response time between said first communication device and a second communication device of the group and a response time between said first communication device and a third communication device of the group, and that generates measurement data indicating a sum of the measured response times, each response time including a transmission delay time between said first communication device as an origin and each of the second or the third communication devices and a process delay time at the second or the third communication devices, wherein, in a case in which said first communication device is not the provisional parent node, said computer program causes said first communication device to function as:

a measurement data transmitter that transmits the measurement data to the provisional parent node of the group; and a decision data receiver that receives decision data indicating which one of the three or more communication devices of the group is a parent node from the provisional parent node, wherein, in a case in which said first communication device is the provisional parent node, said computer program causes said first communication device to function as:

a measurement data receiver that receives measurement data from the second and the third communication devices of the group;

a decision data generator that, in a case in which it is determined, based on the measurement data received by said measurement data receiver and the measurement data generated by said measurement data generator, that the measurement data of said first communication device is only data piece that indicates a minimum value from among pieces of measurement data of the communication devices in the group, generates decision data indicating that said first communication device is the parent node, and otherwise generates decision data indicating that one of the second and the third communication devices that has transmitted the only data piece is the parent node; and a decision data transmitter that transmits the decision data to each of the second and the third communication devices of the group, and wherein said game data transmitter-receiver, in transmitting game data, performs the transmission through a direct communication when said first communication device is the parent node, and performs the transmission through an indirect communication via the parent node when the first communication device is not the parent node.

8. The communication system according to claim 3,
wherein the three or more communication devices comprises four or more communication devices, and
wherein each of the four or more communication devices can belong to the group.

9. The communication system according to claim 3, wherein each of said communication devices that are in the group comprises:
an input unit that receives a player's operation and outputs an operation signal in accordance with the operation;
a game data generator that generates the game data based on the operation signal; and
a controller that advances the game based on game data received by said game data transmitter-receiver.

10. A method comprising:
grouping three or more game devices in which one game device is selected as a provisional parent node, wherein each of the game devices with itself as an origin generates measurement data indicating a sum of response times with respect to other game devices in the group, each response time including a transmission delay time and a process delay time, with the transmission delay time being a transmission time between the originating game device and one of the other game devices as a destination and with the process delay time being a process time at the destination game device, and each of the game devices providing the measurement data to the provisional parent node; and
the provisional parent node selecting a parent node game device based on generated measurement data indicating a minimum sum;
the provisional parent node notifying the three or more game devices of the parent node; and
the three or more game devices becoming a child node based on generated measurement data indicating greater than the minimum sum.

11. The method of claim 10 wherein each child node communicates with another child node via the parent node.

* * * * *